(12) United States Patent
Jamison et al.

(10) Patent No.: US 9,920,604 B2
(45) Date of Patent: Mar. 20, 2018

(54) WELLBORE FLUIDS COMPRISING MINERAL PARTICLES AND METHODS RELATING THERETO

(71) Applicant: Halliburton Energy Services, Inc., Houston, TX (US)

(72) Inventors: Dale E. Jamison, Houston, TX (US); Charles Landis, Houston, TX (US); Jay Deville, Houston, TX (US); Cato McDaniel, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/940,472

(22) Filed: Nov. 13, 2015

(65) Prior Publication Data

US 2016/0068733 A1 Mar. 10, 2016

Related U.S. Application Data

(63) Continuation of application No. 13/753,121, filed on Jan. 29, 2013, now abandoned.

(51) Int. Cl.
*E21B 43/16* (2006.01)
*E21B 33/134* (2006.01)
*E21B 33/138* (2006.01)
*C09K 8/502* (2006.01)
*C09K 8/504* (2006.01)
(Continued)

(52) U.S. Cl.
CPC .............. *E21B 43/16* (2013.01); *C09K 8/032* (2013.01); *C09K 8/42* (2013.01); *C09K 8/502* (2013.01); *C09K 8/5045* (2013.01); *C09K 8/516* (2013.01); *C09K 8/58* (2013.01); *C09K 8/62* (2013.01);
(Continued)

(58) Field of Classification Search
None
See application file for complete search history.

(56) References Cited

U.S. PATENT DOCUMENTS

| 2,936,242 | A |   | 5/1960 | Brauer |   |
|---|---|---|---|---|---|
| 3,164,215 | A | * | 1/1965 | Johnson | E21B 10/30 |
|   |   |   |   |   | 175/261 |

(Continued)

FOREIGN PATENT DOCUMENTS

GB 2490166 10/2012

OTHER PUBLICATIONS

Official Action for Australian Patent Application No. 2014269066 dated Feb. 12, 2016.
(Continued)

*Primary Examiner* — Anuradha Ahuja
(74) *Attorney, Agent, or Firm* — McDermott Will & Emery LLP

(57) ABSTRACT

Mineral particles may provide for wellbore fluids with tailorable properties and capabilities, and methods relating thereto. Mineral particles may be utilized in methods that include introducing a wellbore fluid having a density of about 7 ppg to about 50 ppg into a wellbore penetrating a subterranean formation, the wellbore fluid comprising a base fluid and a plurality of mineral particles, and the wellbore fluid having a first viscosity; contacting at least some of the mineral particles with a linking agent so as to link the at least some of the mineral particles, thereby increasing the first viscosity to a second viscosity.

17 Claims, 2 Drawing Sheets

(51) Int. Cl.
*C09K 8/516* (2006.01)
*C09K 8/03* (2006.01)
*C09K 8/42* (2006.01)
*C09K 8/58* (2006.01)
*C09K 8/62* (2006.01)

(52) U.S. Cl.
CPC .......... *E21B 33/134* (2013.01); *E21B 33/138* (2013.01); *C09K 2208/00* (2013.01)

(56) References Cited

U.S. PATENT DOCUMENTS

| | | | |
|---|---|---|---|
| 3,223,162 A | 12/1965 | Burge | |
| 3,393,200 A * | 7/1968 | Bachmann | C09B 47/06 540/136 |
| 3,804,760 A * | 4/1974 | Darley | C09K 8/502 507/129 |
| 4,585,064 A | 4/1986 | Graham et al. | |
| 4,670,501 A | 6/1987 | Dymond et al. | |
| 5,249,627 A | 10/1993 | Harms et al. | |
| 5,833,000 A | 11/1998 | Weaver et al. | |
| 5,839,510 A | 11/1998 | Weaver et al. | |
| 5,853,048 A | 12/1998 | Weaver et al. | |
| 5,905,061 A | 5/1999 | Patel | |
| 5,919,739 A | 7/1999 | Sunde et al. | |
| 5,977,031 A | 11/1999 | Patel | |
| 6,287,639 B1 | 9/2001 | Schmidt et al. | |
| 6,311,773 B1 | 11/2001 | Todd et al. | |
| 6,439,309 B1 | 8/2002 | Matherly et al. | |
| 6,582,819 B2 | 6/2003 | McDaniel et al. | |
| 6,664,215 B1 | 12/2003 | Tomlinson | |
| 6,677,426 B2 | 1/2004 | Noro et al. | |
| 6,828,279 B2 | 12/2004 | Patel et al. | |
| 7,131,491 B2 | 11/2006 | Blauch et al. | |
| 7,153,575 B2 | 12/2006 | Anderson et al. | |
| 7,350,579 B2 | 4/2008 | Gatlin et al. | |
| 7,392,847 B2 | 7/2008 | Gatlin et al. | |
| 7,534,745 B2 | 5/2009 | Taylor et al. | |
| 7,645,723 B2 | 1/2010 | Kirsner et al. | |
| 7,673,686 B2 | 3/2010 | Nguyen et al. | |
| 7,696,131 B2 | 4/2010 | Oyler et al. | |
| 7,819,192 B2 | 10/2010 | Weaver et al. | |
| 7,825,074 B2 | 11/2010 | Schmidt et al. | |
| 7,956,017 B2 | 6/2011 | Gatlin et al. | |
| 8,003,579 B2 | 8/2011 | Akarsu et al. | |
| 8,006,761 B2 | 8/2011 | Duncum et al. | |
| 8,076,271 B2 | 12/2011 | Blauch et al. | |
| 8,136,595 B2 | 3/2012 | Weaver et al. | |
| 8,168,739 B2 | 5/2012 | Kitamura et al. | |
| 8,261,833 B2 | 9/2012 | Nguyen et al. | |
| 2004/0000434 A1* | 1/2004 | Todd | C09K 8/145 175/65 |
| 2004/0048752 A1* | 3/2004 | Nguyen | C09K 8/68 507/269 |
| 2006/0116296 A1* | 6/2006 | Kippie | C09K 8/12 507/244 |
| 2006/0240995 A1* | 10/2006 | Rickman | C09K 8/512 507/219 |
| 2006/0260808 A1* | 11/2006 | Weaver | C09K 8/80 166/276 |
| 2006/0276348 A1* | 12/2006 | Cowan | C09K 8/5083 507/224 |
| 2007/0056730 A1* | 3/2007 | Keese | C09K 8/16 166/291 |
| 2007/0281867 A1* | 12/2007 | Massam | E21B 21/00 507/200 |
| 2007/0289781 A1 | 12/2007 | Rickman et al. | |
| 2007/0298978 A1* | 12/2007 | Crews | C09K 8/5045 507/265 |
| 2008/0006405 A1 | 1/2008 | Rickman et al. | |
| 2008/0196628 A1 | 8/2008 | Santra et al. | |
| 2008/0230223 A1* | 9/2008 | McCrary | C09D 5/03 166/272.2 |
| 2010/0009874 A1* | 1/2010 | Ballard | C09K 8/03 507/118 |
| 2010/0048429 A1* | 2/2010 | Dobson, Jr. | E21B 43/25 507/212 |
| 2010/0120637 A1* | 5/2010 | Bendejacq | C08F 293/005 507/219 |
| 2010/0152070 A1* | 6/2010 | Ghassemzadeh | C09K 8/035 507/212 |
| 2010/0160187 A1 | 6/2010 | Nguyen et al. | |
| 2010/0179281 A1 | 7/2010 | Nilsen | |
| 2010/0186956 A1* | 7/2010 | Morgan | C09K 8/506 166/293 |
| 2010/0210480 A1* | 8/2010 | Ballard | C09K 8/502 507/117 |
| 2010/0270023 A1* | 10/2010 | Dusterhoft | C09K 8/575 166/308.6 |
| 2010/0294725 A1* | 11/2010 | Bush | C02F 1/5272 210/702 |
| 2010/0298175 A1* | 11/2010 | Ghassemzadeh | C09K 8/5045 507/124 |
| 2010/0323929 A1* | 12/2010 | Reddy | C09K 8/685 507/212 |
| 2011/0009298 A1* | 1/2011 | Dobson, Jr. | C09K 8/14 507/125 |
| 2011/0039737 A1 | 2/2011 | Schmidt et al. | |
| 2011/0098394 A1 | 4/2011 | Schmeltzer et al. | |
| 2012/0024526 A1* | 2/2012 | Liang | C09K 8/56 166/278 |
| 2012/0048548 A1 | 3/2012 | Crews et al. | |
| 2012/0108472 A1 | 5/2012 | Wu | |
| 2012/0165231 A1 | 6/2012 | Miller et al. | |
| 2014/0076558 A1* | 3/2014 | Nguyen | C09K 8/68 166/280.2 |
| 2014/0209386 A1 | 7/2014 | Jamison et al. | |

OTHER PUBLICATIONS

Official Action for Australian Patent Application No. 2014269066 dated Jun. 20, 2016.
European Search Report received in corresponding EP Application No. 14745691, dated Aug. 29, 2016.

* cited by examiner

WELLBORE FLUIDS COMPRISING MINERAL PARTICLES AND METHODS RELATING THERETO

BACKGROUND

The present invention relates to mineral particles that provide for wellbore fluids with tailorable properties and capabilities, and methods relating thereto.

In the exploration and recovery of hydrocarbons from subterranean formations, a variety of wellbore operations are performed, e.g., drilling operations, cementing operations, and stimulation operations. One physical property of the wellbore fluids used in conjunction with these wellbore operations is density. For example during drilling operations, the density of a wellbore fluid must be carefully controlled so as to exert sufficient pressure to stabilize the walls of the wellbore, e.g., to prevent blowouts, while simultaneously not exerting excess pressure that can cause damage to the surrounding subterranean formation. In another example, the density of spacer fluids and cementing operations must be carefully balanced so as to minimize or prevent mixing of other wellbore fluids on either side of the spacer fluid (e.g., a drilling fluid and a cementing fluid).

Changing the density of wellbore fluids is often achieved with the use of particles (often referred to as weighting agents). One of the most common weighting agent used in the exploration recovery of hydrocarbons has been barite. However, as the exploration and recovery of hydrocarbons expands to subterranean formations with harsher conditions (e.g., extreme temperatures, higher pressures, increased depths, and new lithologies) the complexity of wellbore fluids often increases. Wellbore fluid complexity can lead to negative synergistic effects between wellbore additives, including barite. For example, the combination of barite to increase density and viscosifiers to mitigate particle settling can lead to wellbore fluids with viscosities too high to be pumped efficiently and effectively in a wellbore. Accordingly, there is a need for wellbore additives to serve multiple purposes to minimize the number of different additives in a wellbore fluid so as to mitigate negative synergistic effects with each other.

SUMMARY OF THE INVENTION

The present invention relates to mineral particles that provide for wellbore fluids with tailorable properties and capabilities, and methods relating thereto.

One embodiment of the present invention is to a method that comprises introducing a wellbore fluid having a density of about 7 ppg to about 50 ppg into a wellbore penetrating a subterranean formation, the wellbore fluid comprising a base fluid and a plurality of mineral particles, and the wellbore fluid having a first viscosity; contacting at least some of the mineral particles with a linking agent so as to link the at least some of the mineral particles, thereby increasing the first viscosity to a second viscosity.

Another embodiment of the present invention is to a method that comprises introducing a wellbore fluid having a density of about 7 ppg to about 50 ppg into a wellbore penetrating a subterranean formation, the wellbore fluid comprising a base fluid and a plurality of mineral particles, and the wellbore fluid having a first viscosity; and linking the mineral particles with a linking agent so as to yield a second viscosity that is greater than the first viscosity in the wellbore fluid, the wellbore fluid at the second viscosity thereby achieving at least one selected from the group consisting of bridging a fracture, reducing or blocking formation permeability, providing fluid loss control, sealing a rock surface, enabling fluid diversion, plugging a void, controlling water production, and any combination thereof within a first portion of the subterranean formation.

Yet another embodiment of the present invention is to a method that comprises introducing a wellbore fluid having a density of about 7 ppg to about 50 ppg into a wellbore penetrating a subterranean formation, the wellbore fluid comprising a base fluid and a plurality of mineral particles; and contacting at least some of the mineral particles with a linking agent so as to link the at least some of the mineral particles into a hardened mass, thereby forming a plug in the wellbore.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
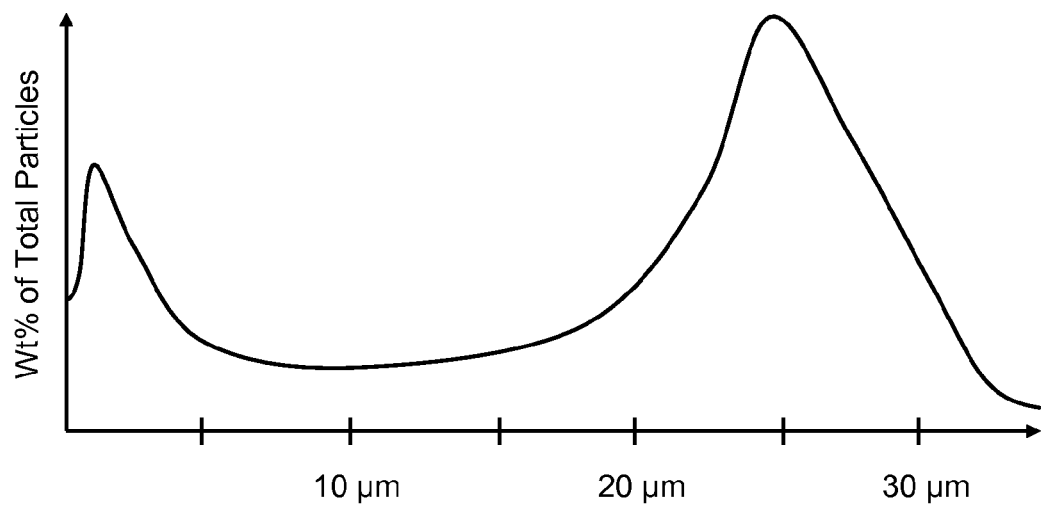
FIGS. 1A-B illustrate examples of theoretical multi-modal diameter distributions for particles.

The present invention relates to mineral particles that provide for wellbore fluids with tailorable properties and capabilities, and methods relating thereto.

The present invention provides for, in some embodiments, mineral particles that can be used in subterranean applications as unique weighting agents. Further, in some embodiments, the mineral particles described herein may advantageously have multiple properties that provide for desirable effects that other wellbore additives would traditionally provide for (e.g., viscosifiers). Accordingly, the mineral particles described herein may advantageously serve as weighting agents and other wellbore additives select viscosifiers, cement particles, sag control additives, proppants, and the like), which may allow for the production of wellbore fluids with tailorable properties and capabilities using minimal types of wellbore additives. As such, the use of the mineral particles described herein in wellbore fluids for multiple purposes may reduce the complexity, and consequently the cost, of such wellbore fluids.

Further, in some weighting agents contexts, the mineral particles described herein may, in some embodiments, have additional advantages over traditional barite weighting agents. For example, in the current barite mining operations, the weighting agents produced can include up to about 21% sand, which can be abrasive to many wellbore tools. The minerals described herein may advantageously be less abrasive, as described further herein, thereby prolonging the life of wellbore tools (e.g., pumps, drill bits, drill string, and a casing). In another example, the mineral particles described herein may, in some embodiments, be degradable, which allows for unique opportunities for cleanup and cementing operations, as described further herein. In yet another example, the mineral particles described herein may, in some embodiments, be recovered and recycled for use in other mineral applications (e.g., smelting). The recycling of the mineral particles further reduces costs and environmental impact of the exploration and recovery of hydrocarbons.

It should be noted that when "about" is used herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments of the present invention, wellbore additives and/or wellbore fluids may comprise the mineral particles described herein. Such wellbore additives and/or wellbore fluids may be used in conjunction with a plurality of wellbore operations. As used herein, the terms "wellbore additive" and "wellbore fluid" refer to any additive or fluid, respectively, suitable for use in conjunction with a wellbore penetrating a subterranean formation and does not imply any particular action by the additive or fluid. Similarly, the term "wellbore operation" refers to any treatment or operation suitable for use in conjunction with a wellbore and/or subterranean formation, e.g., drilling operations, lost circulation operations, fracturing operations, cementing operations, completion operations, and the like.

It should be noted that unless otherwise specified, the term "mineral particles" encompasses single types of mineral particles and combinations of more than one type of mineral particle described herein. Distinctions between types of mineral particles may, in some embodiments, be defined by at least one of mineral composition, production method, average diameter, diameter distribution, shape, presence or absence of coating, coating composition, and the like, and any combination thereof.

I. Mineral Particles

In some embodiments, the mineral particles described herein suitable for, inter alia, increasing the density of wellbore fluids described herein may have a specific gravity ranging from a lower limit of about 2.6, 3, 4, 4.5, 5, or 5.5 to an upper limit of about 20, 15, 10, 9, 8, or 7, and wherein the specific gravity may range from any lower limit to any upper limit and encompasses any subset therebetween.

In some embodiments, the mineral particles described herein may comprise traditional minerals and/or non-traditional minerals useful for weighting a wellbore fluid, which may depend on, inter alia, the application, the desired wellbore fluid properties, the availability of the minerals, and the like, and any combination thereof.

Examples of traditional minerals useful for weighting a wellbore fluid include, but are not limited to, $BaSO_4$, $CaCO_3$, $(Ca,Mg)CO_3$, $FeCO_3$, $Fe_2O_3$, $\alpha\text{-}Fe_2O_3$, $\alpha\text{-}FeO(OH)$, $Fe_3O_4$, $FeTiO_3$, $(Fe,Mg)SiO_4$, $SrSO_4$, $MnO$, $MnO_2$, $Mn_2O_3$, $Mn_3O_4$, $Mn_2O_7$, $MnO(OH)$, $(Mn^{2+},Mn^{3+})_2O_4$, and suitable combinations thereof. Some embodiments described herein may involve grinding bulk mineral materials so as to yield the mineral particles described herein. Additional examples of traditional minerals in their native form may include, but are not limited to, barite, calcium carbonate, dolomite, hematite, siderite, magnetite, manganese dioxide, manganese (IV) oxide, manganese oxide, manganese tetraoxide, manganese (II) oxide, manganese (III) oxide, and suitable combinations thereof.

Examples of non-traditional minerals useful for weighting a wellbore fluid include, but are not limited to, $AgI$, $AgCl$, $AgBr$, $AgCuS$, $AgS$, $Ag_2S$, $Ag_3SbS_3$, $AgSbS_2$, $AgSbS_2$, $Ag_5SbS_4$, $(AgFe_2S_3)$, $Ag_3AsS_3$, $Ag_3AsS_3$, $Cu(Ag,Cu)_6Ag_9As_2S_{11}$, $[(Ag,Cu)_6(Sb,As)_2S_7][Ag_9CuS_4]$, $Ag_3AuTe_2$, $(Ag,Au)Te_2$, $Ag_2Te$, $Al_2O_3$, $Al_2SiO_5$, $AsSb$, $(Co,Ni,Fe)As_3$, $PtAs_2$, $AuTe_2$, $BaCO_3$, $BaO$, $BeO$, $Bi$, $BiOCl$, $(BiO)_2CO_3$, $BiO_3$, $Bi_2S_3$, $Bi_2O_3$, $CaO$, $CaF_2$, $CaWO_4$, $CdS$, $CdTe$, $Ce_2O_3$, $CoAsS$, $Co^{+2}Co^{+3}{}_2S_4$, $(Fe,Mg)Cr_2O_4$, $Cr_2O_3$, $Cu$, $CuO$, $Cu_2O$, $CuS$, $Cu_2S$, $CuS_2$, $Cu_9S_5$, $CuFeS_2$, $Cu_5FeS_4$, $CuS.Co_2S_3$, $Cu_3AsO_4(OH)_3$, $Cu_3AsS_4$, $Cu_{12}As_4S_{13}$, $Cu_2(AsO_4)(OH)$, $CuPb_{13}Sb_7S_{24}$, $CuSiO_3.H_2O$, $Fe_3Al_2(SiO_4)_3$, $Fe^{2+}Al_2O_4$, $Fe_2SiO_4$, $FeWO_4$, $FeAs_2$, $FeAsS$, $FeS$, $FeS_2$, $Fe_{(1-x)}S$ (wherein x=0 to 0.2), $(Fe,Ni)_9S_8$, $Fe^{2+}Ni_2{}^{3+}S_4$, $(Fe,Mn)WO_4$, $Fe^{2+}Nb_2O_6$, $(Mn,Fe,Mg)(Al,Fe)_2O_4$, $CaFe^{2+}{}_2Fe^{3+}Si_2O_7O(OH)$, $(YFe^{3+}Fe^{2+}U,Th,Ca)_2(Nb,Ta)_2O_8$, $HgS$, $Hg_2Cl_2$, $MgO$, $MnCO_3$, $Mn_2S$, $Mn_2SiO_4$, $MnWO_4$, $Mn(II)_3Al_2(SiO_4)_3$, $(Na_{0.3}Ca_{0.1}K_{0.1})(Mn^{4+},Mn^{3+})_2O_4.1.5H_2O$, $(Mn,Fe)_2O_3$, $(Mn^{2+},Fe^{2+},Mg)(Fe^{3+},Mn^{3+})_2O_4$, $Mn^{2+},Mn^{3+})_6[O_8|SiO_4]$, $Ca(Mn^{3+},Fe^{3+})_{14}SiO_{24}$, $Ba(Mn^{2+})(Mn^{4+})_8O_{16}(OH)_4$, $CaMoO_4$, $MoS_2$, $MoO_2$, $MoO_3$, $NbO_4$, $(Na,Ca)_2Nb_2O_6(OH,F)$, $(Y,Ca,Ce,U,Th)(Nb,Ta,Ti)_2O_6$, $(Y,Ca,Ce,U,Th)(Ti,Nb,Ta)_2O_6$, $(Fe,Mn)(Ta,Nb)_2O_6$, $(Ce,La)PO_4$, $(Ce,La,Ca)BSiO_5$, $(Ce,La)CO_3F$, $(Y,Ce)CO_3F$, $(U,Ca,Y,Ce)(Ti,Fe)_2$, $NiO$, $NiAs_2$, $NiAs$, $NiAsS$, $Ni_xFe$ (x=2-3), $(Ni,Co)_3S_4$, $NiS$, $PbTe$, $PbSO_4$, $PbCrO_4$, $PbWO_4$, $PbSiO_3$, $PbCO_3$, $(PbCl)_2CO_3$, $Pb_5(PO_4)_3Cl$, $Pb_5(AsO_4)_3Cl$, $Pb^{2+}{}_2Pb^{4+}O_4$, $Pb_5Au(Te,Sb)_4S_{5-8}$, $Pb_5Sb_8S_{17}$, $PbS$, $Pb_9Sb_8S_{21}$, $Pb_{14}(Sb,As)_6S_{23}$, $Pb_5Sb_4S_{11}$, $Pb_4FeSb_6S_{14}$, $PbCu[(OH)_2|SO_4]$, $PbCuSbS_3$, $(Cu,Fe)_{12}Sb_4S_{13}$, $Sb_2S_3$, $(Sb^{3+},Sb^{5+})O_4$, $Sb_2SnO_5$, $Sc_2O_3$, $SnO$, $SnO_2$, $Cu_2FeSnS_4$, $SrO$, $SrCO_3$, $(Na,Ca)_2Ta_2O_6(O,OH,F)$, $ThO_2$, $(Th,U)SiO_4$, $TiO_2$, $UO_2$, $V_2O_3$, $VO_2$, $V_2O_5$, $Pb_5(VO_4)_3Cl$, $VaO$, $Y_2O_3$, $YPO_4$, $ZnCO_3$, $ZnO$, $ZnFe_2O_4$, $ZnAl_2O_4$, $ZnCO_3$, $ZnS$, $ZnO$, $(Zn_{(1-x)}Fe_{(x)}S)$, $(Zn,Fe)S$, $ZrSiO_4$, $ZrO_2$, $ZrSiO_4$, and suitable combinations thereof. Additional examples of non-traditional minerals in their native form may include, but are not limited to, acanthite, alamandite, allemontite, altaite, aluminum oxide, andalusite, anglesite, antimony sulfide, antimony tin oxide, antimony trioxide, argentite, arsenopyrite, awaruite, barium carbonate, barium oxide, bastnaesite, beryllium oxide, birnessite, bismite, bismuth, bismuth oxycarbonates, bismuth oxychloride, bismuth sulfide, bismuth sulfide, bismuth trioxide, bismuth (III) oxide, bixbyite, bornite, boulangerite, bournonite, brannerite, braunite, bravoite, bromyrite, cadimum sulfide, cadimum telluride, calaverite, calcium oxide, calomel, carrollite, cassiterite, celestine, cerargyrite, cerium oxide, cerussite, cervantite, chalcocite, chalcopyrite, chromite, chromium oxide, cinnabar, clinoclase, cobaltite, columbite, copper, copper oxide, copper sulfide, corundum, covellite, crocoite, cuprite, danaite, digenite, embolite, enargite, euxenite, fayalite, ferberite, fergusonite, ferrous sulfide, franklinite, gahnite, galaxite, galena, geocronite, geothite, gersdorffite, greenockite, hausmmanite, hercynite, hessite, huebnerite, ilmenite, ilvaite, iodyrite, iridosmine, Jacobsite, Jamesonite, krennerite, larsenite, linarite, linnaeite, loellingite, magnesium oxide, manganese carbonate, manganite, manganosite, marcasite, marmatite, menaghinite, miargyrite, microlite, millerite, mimetite, minium, molybdenite, molybdenum (IV) oxide, molybdenum oxide, molybdenum trioxide, monazite, nagyagite, niccolite, nickel oxide, pearceite, pentlandite, perovskite, petzite, phosgenite, phyromorphite, plagionite, polianite, polybasite, polycrase, powellite, proustite, psilomelane, pyrargyrite, pyrite, pyrochlore, pyrolusite, pyrrhotite, rammelsbergite, rutile, samarskite, scandium oxide, scheelite, semsyite, siegenite, skutterudite, smithsonite, spalerite, sperrylite, spessartite, sphalerite, stannite, stephanite, sternbergite, stibnite, stillwellite, stolzite, Stromeyerite, strontium oxide, sylvanite, tantalite, tennantite, tenorite, tephroite, tetrahedrite, thorianite, thorite, tin dioxide, tin (II) oxide, titanium dioxide, turgite, uraninite, vanadinite, vanadium oxide, vanadium trioxide, vanadium (IV) oxide, vanadium (V) oxide, violarite, witherite, wolframite, wulfenite, wurtzite, xenotime, yttrium oxide, zinc carbonate, zincite, zinkenite, zircon, zirconium oxide, zirconium silicate, zinc oxide, and suitable combinations thereof.

One of ordinary skill in the art should understand that some of the mineral particles described herein may have health and/or environmental considerations.

In some embodiments, the mineral particles described herein may be produced by grinding methods, precipitation methods, melt form plasma methods, etching bulk minerals, or any combination thereof, each where applicable based on, inter alia, the composition of the mineral particle. It should be noted that the term "grinding" refers to mechanically breaking down the material into smaller pieces and encompasses milling, Raymond milling, roller milling, ball milling, and grinding, machine grinding, crushing, and the like.

It should be noted that as used herein, the terms "median diameter" and "diameter distribution" refers to a weight median diameter and a weight diameter distribution, respectively, wherein the diameter is based on the largest dimension of the particles. For example, rod-like particles would have diameter distributions and the like based on the length of the rod-like particles. As used herein, the term "median diameter" refers to a diameter distribution wherein 50% of the particles are smaller than a given value.

In some embodiments, the mineral particles described herein produced by grinding methods may have a median diameter ranging from a lower limit of about 100 nm, 250 nm, 500 nm, 1 micron, or 5 microns to an upper limit of about 5000 microns, 2500 microns, 1000 microns, 500 microns, 100 microns, 75 microns, 50 microns, 25 microns, or 10 microns, and wherein the median diameter may range from any lower limit to any upper limit and encompasses any subset therebetween. One of ordinary skill in the art should understand that larger particle sizes may be appropriate in some instances, e.g., mineral particles used in lost circulation or proppant compositions and methods. For example, the median diameter of the mineral particles may range from a lower limit of about 350 microns, 500 microns, or 1 mm to an upper limit of about 15 mm, 10 mm, or 5 mm, and wherein the median diameter may range from any lower limit to any upper limit and encompasses any subset therebetween.

Some embodiments of the present invention may involve precipitating particles from two or more salts in aqueous solutions so as to yield the mineral particles described herein (or precursors to mineral particles described herein, e.g., particles that can be further calcined to yield mineral particles described herein). For example, some embodiments of the present invention may involve precipitating manganese carbonate from manganese (II) salts in aqueous solutions with alkali metal carbonates so as to yield the mineral particles described herein that comprise manganese carbonate. Examples of other salts that may be used in producing precipitated mineral particles may include salts (e.g., fluorides, chlorides, bromides, iodides, acetates, formates, citrates, sulfates, carbonates, hydroxides, phosphates, silicates, molybdates, tungstates, vanadates, titanates, chromates, and the like) of barium, bismuth, chromium, cobalt, copper, gold, iron, lead, nickel, strontium, tin, zinc, manganese, tungsten, aluminum, silver, cerium, magnesium, zirconium, titanium, calcium, antimony, lead, and the like, and any combination thereof.

Some precipitation embodiments described herein may further involve adjusting the pH of the aqueous solution, adjusting the temperature of the aqueous solution, adding morphology modifiers to the aqueous solution, adding aqueous-miscible organic liquids (e.g., an alcohol or acetone) to the aqueous solution, using capping agents (e.g., compounds with moieties that interact with the crystal being formed so as to stop, slow, and/or direct growth of the crystal), and any combination thereof. The foregoing may be useful in regulating the average diameter, diameter distribution, and shape of the mineral particles described herein. For example, increasing the pH and/or temperature may increase the average diameter of the mineral particles described herein. In another example, additional polyelectrolytes may be used to synthesize mineral particles having a desired non-spherical shape.

In some embodiments, the particles produced by precipitation may be calcined to yield mineral particles described herein. Calcining may, inter alia, increase the mechanical properties (e.g., crush strength) of the mineral particles, yield a corresponding oxide (e.g., manganese carbonate to manganese oxide, calcium carbonate to calcium oxide, bismuth carbonate to bismuth oxycarbonate or bismuth oxide, zirconium hydroxide to zirconium oxide, or magnesium hydroxide to magnesium oxide), or any combination thereof.

Examples of mineral particles that can be produced with precipitation methods (optionally including calcining steps) may include, but are not limited to, AgI, AgCl, AgBr, AgCuS, AgS, $Ag_2S$, $Al_2O_3$, AsSb, $AuTe_2$, $BaCO_3$, $BaSO_4$, $BaCrO_4$, BaO, BeO, BiOCl, $(BiO)_2CO_3$, $BiO_3$, $Bi_2S_3$, $Bi_2O_3$, CaO, $CaF_2$, $CaWO_4$, $CaCO_3$, $(Ca,Mg)CO_3$, CdS, CdTe, $Ce_2O_3$, CoAsS, $Cr_2O_3$, CuO, $Cu_2O$, CuS, $Cu_2S$, $CuS_2$, $Cu_9S_5$, $CuFeS_2$, $Cu_5FeS_4$, $CuS.Co_2S_3$, $Fe^{2+}Al_2O_4$, $Fe_2SiO_4$, $FeWO_4$, $FeAs_2$, FeAsS, FeS, $FeS_2$, $FeCO_3$, $Fe_2O_3$, $\alpha\text{-}Fe_2O_3$, $\alpha\text{-}FeO(OH)$, $Fe_3O_4$, $FeTiO_3$, HgS, $Hg_2Cl_2$, MgO, $MnCO_3$, $Mn_2S$, $MnWO_4$, MnO, $MnO_2$, $Mn_2O_3$, $Mn_3O_4$, $Mn_2O_7$, MnO(OH), $CaMoO_4$, $MoS_2$, $MoO_2$, $MoO_3$, $NbO_4$, NiO, $NiAs_2$, NiAs, NiAsS, NiS, PbTe, $PbSO_4$, $PbCrO_4$, $PbWO_4$, $PbCO_3$, $(PbCl)_2CO_3$, $Pb^{2+}_2Pb^{4+}O_4$, $Sb_2SnO_5$, $Sc_2O_3$, SnO, $SnO_2$, SrO, $SrCO_3$, $SrSO_4$, $TiO_2$, $UO_2$, $V_2O_3$, $VO_2$, $V_2O_5$, VaO, $Y_2O_3$, $YPO_4$, $ZnCO_3$, ZnO, $ZnFe_2O_4$, $ZnAl_2O_4$, ZnS, $ZrSiO_4$, $ZrO_2$, $ZrSiO_4$, and any combination thereof in discrete domains and/or a substantially homogeneous domain.

In some embodiments, combination of more than one salt may be used to form precipitated particles with two or more of the foregoing precipitates in substantially homogeneous domain. For example, strontium and barium salts may be utilized in forming precipitated particles that comprise $(Ba,Sr)SO_4$ or $(Ba,Sr)CO_3$. In another example, barium salts may be used in forming precipitated particles that comprise $Ba(SO_4,CrO_4)$. Examples of other substantially homogeneous domains may include, but are not limited to, suitable mixtures of barium, strontium, calcium, zinc, iron, cobalt, manganese, lead, tin, and the like, and any combination thereof in the form of sulfates, carbonates, hydroxide, oxides, sulfides, chromates and the like, and any combination thereof.

Some embodiments may involve forming precipitated mineral particles with discrete domains that comprise at least one of the foregoing precipitates. For example, a calcium carbonate particle may be formed by precipitation and then barium salts added so as to precipitate barium carbonate on at least a portion of the surface of the calcium carbonate precipitated particle. In another example, a higher specific gravity composition like those comprising bismuth may be precipitated and then a different composition precipitated thereon. Precipitating a second composition on a first composition may allow for the first composition to be formed with a desired shape and the second composition to increase the specific gravity of the particle, which may allow for a desired higher specific gravity particle with a desired shape that may be difficult to achieve otherwise. In another example, the higher specific gravity particle may be the first composition and the second composition precipitated thereon may enable linking of the particles or reduce the abrasiveness of the particles (described further herein).

In some embodiments, the mineral particles produced by precipitation may be calcined to yield precipitated particles described herein. Calcining may, inter alia, increase the mechanical properties (e.g., crush strength) of the precipitated particles, yield a corresponding oxide (e.g., manganese carbonate to manganese oxide, calcium carbonate to calcium oxide, bismuth carbonate to bismuth oxycarbonate or bismuth oxide, zirconium hydroxide to zirconium oxide, or magnesium hydroxide to magnesium oxide), or any combination thereof.

In some embodiments, the precipitated mineral particles described herein may be shaped as spherical, ovular, substantially spherical, substantially ovular, discus, platelet, flake, toroidal (such as donut-shaped), dendritic, acicular, spiked with a substantially spherical or ovular shape (such as a sea urchin), spiked with a discus or platelet shape, rod-like, fibrous (such as high-aspect ratio shapes), polygonal (such as cubic or pyramidal), faceted (such as the shape of crystals), star or floral shaped (such as a tripod or tetrapod where rods or the like extend from a central point), or any hybrid thereof (e.g., a dumbbell-shape). For example, spherical, ovular, substantially spherical, and substantially ovular-shaped precipitated mineral particles may be useful in producing wellbore fluids that are less abrasive to wellbore tools and/or decrease viscosity as compared to ground mineral particles. In another example, platelet, flake, acicular, spiked with a discus or platelet shape, rod-like, and fibrous-shaped precipitated mineral particles may be useful in producing wellbore fluids with less sag and/or greater viscosity as compared to ground mineral particles.

In some embodiments, the precipitated mineral particles described herein may have a median diameter ranging from a lower limit of about 5 nm, 10 nm, 20 nm, 50 nm, 100 nm, 250 nm, 500 nm, or 1 micron to an upper limit of about 100 microns, 50 microns, 25 microns, 10 microns, 5 microns, 1 micron, or 750 nm, and wherein the median diameter may range from any lower limit to any upper limit and encompasses any subset therebetween. One of ordinary skill in the art should understand that precipitation methods may be used to yield larger sizes of mineral particles that are millimeters or larger in size. For example, precipitated mineral particles having a median diameter of about 1-10 mm may be used as proppants or lost circulation materials.

In some embodiments, the precipitated particles may be ground to achieve a desired size and/or shape. Methods that involve precipitation and then grinding may advantageously allow for production of higher purity precipitated particles as compared to particles produced by grinding bulk minerals. Further, such methods may allow for reduced cost while maintaining high purity as compared to some precipitation methods with steps to control particle size. In some instances, larger precipitated particles may be directly added to a mined mineral and undergo the same grinding process such that the ground product may have a higher purity than the mineral alone. For example, large particles of barium sulfate may formed by precipitation and added to mined barite with high levels of contaminants (e.g., greater than 15% sand) such that the ground product is higher purity, which yields a less abrasive, higher specific gravity weighting agent that is of greater value in the industry.

In some embodiments, the conditions under which the precipitated particles are formed may be manipulated so as to assist in controlling or directing the characteristics of the precipitated particles (e.g., shape, median diameter, diameter distribution, narrow diameter distribution, density, hardness, and the like). Examples of conditions that can be manipulated may include, but are not limited to, pH, temperature, chemical composition of morphology modifiers, concentration of morphology modifiers, concentration of the salts used in the production of the precipitated particles, and the like, and any combination thereof. For example, increasing the pH and/or temperature may increase the median diameter of the precipitated particles. As used herein, the term "morphology modifiers" refers to chemicals that are used during the formation of precipitated particles that effect the characteristics of the precipitated particles. Examples of morphology modifiers may include, but are not limited to, polymers, surfactants, electrolytes, hydrogen peroxide, silicates and other similar inorganic materials, aqueous-miscible organic liquids, and the like, and any combination thereof.

Additional examples of precipitation methods to produce at least some of the mineral particles described herein are disclosed in Ser. No. 13/752,697 filed the same day as the present application, the entirety of which is incorporated herein by reference.

Figure 1B:
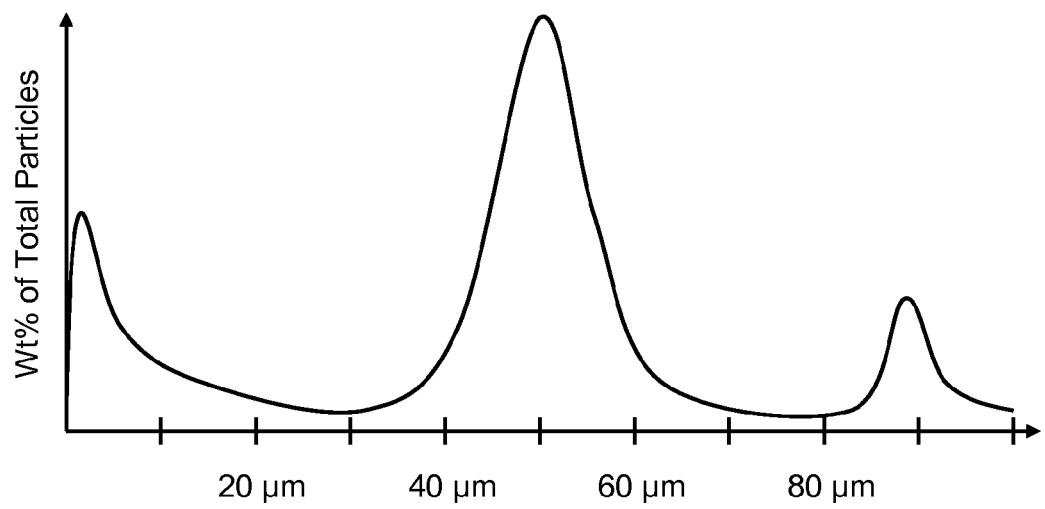

In some embodiments, the wellbore additives and/or the wellbore fluids may comprise the mineral particles described herein having a multimodal diameter distribution (e.g., bimodal, trimodal, and so on). In some embodiments, the wellbore additives and/or the wellbore fluids may comprise the mineral particles described herein having a multimodal diameter distribution such that at least one mode has an average diameter (or peak diameter) ranging from a lower limit of about 5 nm, 10 nm, 20 nm, 50 nm, 100 nm, 250 nm, 500 nm, or 1 micron to an upper limit of about 50 microns, 10 microns, 5 microns, 1 micron, or 500 nm and at least one mode has an average diameter ranging from a lower limit of about 10 microns, 25 microns, 50 microns, or 100 microns to an upper limit of about 5000 microns, 2500 microns, 1000 microns, 500 microns, 100 microns, or 50 microns, and wherein each mode may range from any corresponding lower limit to any corresponding upper limit such that at least two distinct modes are present and each range encompasses any corresponding subset therebetween. By way of nonlimiting example, FIGS. 1A-B illustrate appropriate multimodal diameter distributions for use in wellbore fluids. FIG. 1A illustrates a bimodal diameter distribution with a first mode average diameter of about 1 micron and a second mode average diameter of about 25 microns. FIG. 1B illustrates a trimodal diameter distribution with a first mode average diameter of about 5 microns, a second mode average diameter of about 50 microns, and a third mode average diameter of about 90 microns.

In some embodiments, the mode(s) of a diameter distribution may independently be considered to have a narrow diameter distribution. That is, at least one mode of a diameter distribution (including monomodal) may have a standard deviation of about 2% or less of the peak diameter for the given mode (e.g., about 0.1% to about 2% or any subset therebetween). In some embodiments, precipitation methods may be advantageously employed to achieve narrow diameter distributions of mineral particles described herein.

In some embodiments, the mineral particles described herein may have a coating on at least a portion of the surface of the mineral particles. As used herein, the term "coating," and the like, does not imply any particular degree of coating on the particle. In particular, the terms "coat" or "coating" do not imply 100% coverage by the coating on the particle. Further, a coating may, in some embodiments, be covalently and/or noncovalently associate with the mineral particles described herein.

In some embodiments, a coating suitable for use in conjunction with the mineral particles described herein may include, but are not limited to, polymers, surfactants, and any combination thereof. Coatings may, in some embodiments, assist in the suspension of the mineral particles and/or the compatibility of the mineral particles with a wellbore fluid and/or wellbore operation. For example, a coating like an alkyl amine may, in some embodiments, associate with the surface of the mineral particles so as to render the mineral particle more hydrophobic, which may enhance the suspendability of the mineral particles in oil-based fluids.

In some embodiments, a coating may be applied during production of the mineral particles described herein. For example, grinding production methods may, in some embodiments, be conducted in the presence of polymers, surfactants, or the like suitable for use as a coating. Additionally, in some embodiments, precipitation production methods may be conducted in the presence of polymers, surfactants, or the like suitable for use as a coating. One skilled in the art with the benefit of this disclosure should understand that including polymers, surfactants, or the like in a production method of the mineral particles described herein should be chosen so as not to significantly impact the production in a negative manner.

Polymers suitable for use in conjunction with the coated mineral particles described herein may, in some embodiments, have a molecular weight ranging from a lower limit of about 10,000 g/mol, 25,000 g/mol, 100,000 g/mol, or 250,000 g/mol to an upper limit of about 2,000,000 g/mol, 1,000,000 g/mol, 500,000 g/mol, or 250,000 g/mol, and wherein the molecular weight may range from any lower limit to any upper limit and encompasses any subset therebetween. Examples of polymers suitable for use in conjunction with the coated mineral particles described herein may, in some embodiments, include, but are not limited to, homopolymers or copolymers of monomers selected from the group comprising: acrylic acid, itaconic acid, maleic acid or anhydride, hydroxypropyl acrylate vinylsulphonic acid, acrylamido 2-propane sulphonic acid, acrylamide, methacrylamide, hydrolyzed acrylamide, styrene sulphonic acid, acrylic phosphate esters, methyl vinyl ether, vinyl acetate, stearyl methacrylate, butylacrylate, vinyl pyrrolidone, glycols (ethylene glycol, propylene glycol, and butylene glycol), and the like, salts thereof where appropriate, any derivative thereof, and any combination thereof. Examples of commercially available polymers may include Pluronic® surfactants (polyethylene oxide-polypropylene oxide-polyethylene oxide triblock polymers, available from BASF), Tetronic® surfactants (tetra-functional block copolymers based on ethylene oxide and propylene oxide, available from BASF), and the like, and any combination thereof.

Examples of surfactants suitable for use in conjunction with the coated mineral particles described herein may, in some embodiments, include, but are not limited to, oleic acid, monobasic fatty acids, polybasic fatty acids, alkylbenzene sulfonic acids, alkane sulfonic acids, linear alpha-olefin sulfonic acid, phospholipids, betaines, and the like, salts thereof where appropriate, any derivative thereof, and any combination thereof. Examples of commercially available surfactants may include Brij® surfactants (ethoxylated fatty alcohols, available from Sigma-Aldrich), Triton® surfactants (ethoxylated fatty alkylphenols, available from Sigma-Aldrich), and the like, and any combination thereof.

In some embodiments, coatings may comprise consolidating agents that generally comprise any compound that is capable of minimizing particulate migration, which may be suitable for methods and compositions relating to proppant packs, gravel packs, and the like. Suitable consolidating agents may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, silicon-based resins, and binders. Combinations and/or derivatives of these also may be suitable. Nonlimiting examples of suitable non-aqueous tackifying agents may be found in U.S. Pat. Nos. 7,392,847, 7,350,579, 5,853,048; 5,839,510; and 5,833,000, the entire disclosures of which are herein incorporated by reference. Nonlimiting examples of suitable aqueous tackifying agents may be found in U.S. Pat. Nos. 8,076,271, 7,131,491, 5,249,627 and 4,670,501, the entire disclosures of which are herein incorporated by reference. Nonlimiting examples of suitable crosslinkable aqueous polymer compositions may be found in U.S. Patent Application Publication No. 2010/0160187 and U.S. Pat. No. 8,136,595 the entire disclosures of which are herein incorporated by reference. Nonlimiting examples of suitable silyl-modified polyamide compounds may be found in U.S. Pat. No. 6,439,309 entitled the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication No. 2008/0006405 and U.S. Pat. No. 8,261,833, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable consolidating agent emulsions may be found in U.S. Patent Application Publication No. 2007/0289781 the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394, 2010/0179281, and U.S. Pat. Nos. 8,168,739 and 8,261,833, the entire disclosures of which are herein incorporated by reference. Nonlimiting examples of suitable binders may be found in U.S. Pat. Nos. 8,003,579; 7,825,074; and 6,287,639, as well as U.S. Patent Application Publication No. 2011/0039737, the entire disclosures of which are herein incorporated by reference. It is within the ability of one skilled in the art, with the benefit of this disclosure, to determine the type and amount of consolidating agent to include in the methods of the present invention to achieve the desired results.

II. Characteristics and Capabilities of Wellbore Fluids Comprising Mineral Particles Described Herein In some embodiments, the wellbore fluids described herein may comprise a base fluid and the mineral particles described herein. Generally, the mineral particles described herein may be useful as weighting agents so as to adjust the density of a wellbore fluid described herein. Further, in some embodiments, the mineral particles may serve other functions as described further herein.

II.a. Density

Traditionally, weighting agents have consisted essentially of a single mineral, most commonly barite (sometimes with up to 21% sand contamination), with a monomodal diameter distribution. Given the reduced quality of barite and availability of other minerals around the world, the mineral particles described herein (individually or in combination) may, in some embodiments, be included in the wellbore additives and/or the wellbore fluids as a barite substitute weighting agent or a barite augmenting weighting agent.

In some embodiments, the wellbore additives and/or the wellbore fluids may comprise the mineral particles described herein so as to achieve a desired density of the wellbore fluid. In some embodiments, the wellbore fluids described herein may have a density between a lower limit of about 7 pounds per gallon ("ppg"), 9 ppg, 12 ppg, 15 ppg, or 22 ppg to an upper limit of about 50 ppg, 40 ppg, 30 ppg, 22 ppg, 20 ppg, or 17 ppg, and wherein the density of the wellbore fluid may range from any lower limit to any upper limit and encompasses any subset therebetween. One of ordinary skill in the art should understand that the ability to achieve a desired density of the wellbore fluid while maintaining a fluid that can be pumped may depend on, inter alia, the composition and specific gravity of the mineral particles, the shape of the mineral particles, the concentration of the mineral particles, and the like, and any combination thereof. For example, wellbore fluids having a density of about 25 ppg or higher may be achieved with mineral particles having a specific gravity of about 7 or greater and having a shape of spherical, substantially spherical, ovular, substantially ovular, or a hybrid thereof so as to allow for the fluid to be pumpable. In another example, wellbore fluids having a density of about 30 ppg or less may be achieved with precipitated particles having a specific gravity of about 7 or greater and having a larger variety of shapes, including discus.

While the plurality of mineral particles described herein (e.g., those listed in Section I) may be useful in modifying the density of a wellbore fluid, in some preferred embodiments, achieving a desired density may utilize the mineral particles described herein that comprise at least one of a rhodochrosite, tenorite, awaruite, albandite, bismuth oxychloride, fluorite, manganese carbonate, manganese (II) oxide, manganese (II, III) oxide, manganese (III) oxide, manganese (IV) oxide, manganese (VII) oxide, spalerite, strontianite, tenorite, zinc carbonate, zinc oxide, and any combination thereof.

In some embodiments, a mixture of two or more types of mineral particles described herein having a multiparticle specific gravity useful for achieving a desired density. As used herein, the term "multiparticle specific gravity" refers to the calculated specific gravity from Formula I.

multiparticle specific gravity=vol % $A*sg_A$+vol % $B*sg_B$+vol % $n*sg_n$     Formula I:

wherein vol % is the volume percent of particle relative to the total volume of the particles used as weighting agent, sg is the specific gravity of the particle, A is the first particle, B is the second particle, and n is the $n^{th}$ particle In some embodiments, the wellbore additives and/or wellbore fluids may comprise a mixture of mineral particles described herein having a multiparticle specific gravity ranging from a lower limit of about 3, 4, 4.5, 5, or 5.5 to an upper limit of about 20, 15, 10, 9, 8, or 7, and wherein the multiparticle specific gravity may range from any lower limit to any upper limit and encompasses any subset therebetween. One of ordinary skill in the art with the benefit of this disclosure should understand that when specific gravity is referred to in combination with multiple mineral particles, specific gravity refers to the multiparticle specific gravity.

In some embodiments, when using two or more precipitated particles with different specific gravities to produce a homogeneous wellbore fluid, the size and shape of each of the precipitated particles may be tailored so as to minimize separation of the precipitated particles, which may lead to a wellbore fluid with a striated density profile. For example, a first precipitated particle with a discus or platelet shape may impede the settling of a second precipitated particle that has a high settling or migration rate (e.g., a higher specific gravity, spherical particle).

II.b. Abrasiveness

In some embodiments, the properties of the mineral particles described herein may be tailored to mitigate the abrasion of wellbore tools (e.g., pumps, drill bits, drill string, and a casing) as compared to comparable API grade barite (i.e., a comparable wellbore fluid having the same density and/or sag as the wellbore fluid comprising the mineral particles), which may prolong the life of the wellbore tools. It should be noted that the term "wellbore tools" encompasses tools suitable for use in conjunction with wellbore operations, including tools that are used outside of the wellbore, e.g., pumps, shakers, and the like. Abrasion can be measured by the ASTM G75-07 and is reported as a Miller Number or a SAR Number.

Suitable mineral particles can be those with properties tailored to mitigate abrasion, which may include, but are not limited to, hardness (e.g., a Mohs hardness of less than about 5), size (e.g., median diameter less than about 400 nm or mode of a multimodal distribution having an peak diameter less than about 400 nm), shape (e.g., particle shapes with higher sphericity like spherical, substantially spherical, ovular, substantially ovular, and the like), coatings (e.g., thicker and/or elastic coatings that minimize physical interactions between the mineral portion of the particle and the wellbore tool), and the like, and any combination thereof. For example, wellbore additives and/or the wellbore fluids may comprise substantially spherical awaruite particles with a median diameter less than about 400 nm and manganese carbonate particles, which have a Mohs hardness less than about 5.

In some embodiments, wellbore additives and/or the wellbore fluids may comprise at least one of the foregoing suitable mineral particles that mitigate abrasion of wellbore tools in combination with at least one mineral particle described herein that may not mitigate abrasion of wellbore tools. For example, wellbore additives and/or the wellbore fluids that are less abrasive than the comparable wellbore fluid (i.e., comprising API-grade barite and having the same density and/or sag) may comprise manganese carbonate particles with a median diameter less than about 400 nm and awaruite particles with a median diameter greater than about 500 nm.

Examples of mineral particles with a Mohs hardness of less than about 5 may include $BaSO_4$, $CaCO_3$, $(Ca,Mg)CO_3$, $FeCO_3$, $FeTiO_3$, $(Fe,Mg)SiO_4$, $SrSO_4$, $MnO(OH)$, barite, calcium carbonate, dolomite, siderite, manganese dioxide, AgI, AgCl, AgBr, AgS, $Ag_2S$, $Ag_3SbS_3$, $AgSbS_2$, $AgSbS_2$, $Ag_5SbS_4$, $(AgFe_2S_3)$, $Ag_3AsS_3$, $Ag_3AsS_3$, $Cu(Ag,Cu)_6$ $Ag_9As_2S_{11}$, $[(Ag,Cu)_6(Sb,As)_2S_7][Ag_9CuS_4]$, $Ag_3AuTe_2$, (Ag,Au)Te$_2$, Ag$_2$Te, Al$_2$SiO$_5$, AsSb, AuTe$_2$, BaCO$_3$, BaO, Bi, BiOCl, Bi$_2$S$_3$, Bi$_2$O$_3$, CaF$_2$, CaWO$_4$, CdS, CdTe, Co$^{+2}$Co$^{+3}{}_2$S$_4$, Cu, CuO, Cu$_2$O, CuS, Cu$_2$S, CuS$_2$, Cu$_9$S$_5$, CuFeS$_2$, Cu$_5$FeS$_4$, Cu$_3$AsO$_4$(OH)$_3$, Cu$_3$AsS$_4$, Cu$_{12}$As$_4$S$_{13}$, Cu$_2$(AsO$_4$)(OH), CuPb$_{13}$Sb$_7$S$_{24}$, CuSiO$_3$.H$_2$O, Fe$_2$SiO$_4$, FeWO$_4$, FeS, Fe$_{(1-x)}$S (wherein x=0 to 0.2), (Fe,Mn)WO$_4$, (Mn,Fe,Mg)(Al,Fe)$_2$O$_4$, (YFe$^{3+}$Fe$^{2+}$U,Th,Ca)$_2$(Nb,Ta)$_2$O$_8$, HgS, MnCO$_3$, Mn$_2$S, MnWO$_4$, (Na$_{0.3}$Ca$_{0.1}$K$_{0.1}$)(Mn$^{4+}$,Mn$^{3+}$)$_2$O$_4$.1.5H$_2$O, Ca(Mn$^{3+}$,Fe$^{3+}$)$_{14}$SiO$_{24}$, CaMoO$_4$, MoS$_2$, (Y,Ca,Ce,U,Th)(Nb,Ta,Ti)$_2$O$_6$, (Ce,La)PO$_4$, (Ce,La)CO$_3$F, (Y,Ce)CO$_3$F, NiS, PbTe, PbSO$_4$, PbCrO$_4$, PbWO$_4$, PbSiO$_3$, PbCO$_3$, (PbCl)$_2$CO$_3$, Pb$_5$(PO$_4$)$_3$Cl, Pb$_5$(AsO$_4$)$_3$Cl, Pb$^{2+}{}_2$Pb$^{4+}$O$_4$, Pb$_5$Au(Te,Sb)$_4$S$_{5-8}$, Pb$_5$Sb$_8$S$_{17}$, PbS, Pb$_9$Sb$_8$S$_{21}$, Pb$_5$Sb$_4$S$_{11}$, Pb$_4$FeSb$_6$S$_{14}$, PbCu[(OH)$_2$|SO$_4$], PbCuSbS$_3$, (Cu,Fe)$_{12}$Sb$_4$S$_{13}$, Sb$_2$S$_3$, (Sb$^{3+}$,Sb$^{5+}$)O$_4$, Cu$_2$FeSnS$_4$, SrCO$_3$, (Th,U)SiO$_4$, Pb$_5$(VO$_4$)$_3$Cl, YPO$_4$, ZnCO$_3$, ZnO, ZnCO$_3$, ZnO, (Zn$_{(1-x)}$Fe$_{(x)}$S), (Zn,Fe)S, acanthite, allemontite, altaite, anglesite, antimony sulfide, argentite, barium carbonate, bastnaesite, birnessite, bismite, bismuth, bismuth oxychloride, bismuth sulfide, bismuth sulfide, bismuth (III) oxide, bornite, boulangerite, bournonite, bromyrite, cadimum sulfide, calaverite, celestine, cerargyrite, cerussite, cervantite, chalcocite, chalcopyrite, cinnabar, clinoclase, copper, copper oxide, copper sulfide, covellite, crocoite, cuprite, digenite, embolite, enargite, ferberite, ferrous sulfide, galena, greenockite, hessite, huebnerite, ilmenite, iodyrite, Jamesonite, krennerite, linarite, manganese carbonate, manganite, marmatite, menaghinite, miargyrite, millerite, mimetite, minium, molybdenite, monazite, nagyagite, pearceite, pentlandite, petzite, phosgenite, phyromorphite, plagionite, polybasite, proustite, pyrargyrite, pyrrhotite, scheelite, semsyite, siderite, smithsonite, sphalerite, stannite, stephanite, sternbergite, stibnite, stolzite, sylvanite, tennantite, tenorite, tetrahedrite, thorite, vanadinite, witherite, wolframite, wulfenite, wurtzite, xenotime, zinc carbonate, zincite, zinc oxide, and suitable combinations thereof.

II.c. Sag Control

Particles (e.g., weighting agents, proppants, and cement particles) in wellbore fluids can settle from the wellbore fluid therein, which is a condition known as "sag." As used herein, the term "sag" refers to an inhomogeneity in density of a fluid in a wellbore, e.g., along the length of a wellbore and/or the diameter of a deviated wellbores. In some instances, sag can cause to portions of the wellbore fluid to be at an insufficient density to stabilize the wellbore and other portions of the wellbore fluid to have increased density. Unstabilized portions of the wellbore can lead to wellbore collapse and/or pressure buildups that cause blowouts. Increased density can cause wellbore damage (e.g., undesired fracturing of the wellbore), which may show up as pressure increases or decreases when changing from static to flow conditions of the fluid which can cause higher than desired pressures downhole.

In some embodiments, the mineral particles described herein may be sized, shaped, or otherwise treated (e.g., coated) so as to mitigate sag in wellbore fluids. The size may, inter alia, provide for the formation of a stable suspension that exhibit low viscosity under shear. Further, the specific gravity of the mineral particles may further allow for such mineral particles to provide for a desired density of the wellbore fluid while mitigating sag of these mineral particles or other particles therein.

Sag control can be measured by analyzing density changes in an undisturbed sample of wellbore fluid over time at a typical wellbore temperature (e.g., about 300° F.) and an elevated pressure (e.g., about 5,000 psi to about 10,000 psi). For example, the mineral particles described herein that provide effective sag control may, in some embodiments, yield wellbore fluids having a change in density of less than about 1 ppg (e.g., about 0.5 ppg change or less including no change in density) when comparing a fluid's original density to the fluid's density at the bottom of a sample having been undisturbed for a given amount of time. In some embodiments, the mineral particles described herein may provide sag control (i.e., a density change of less than about 1 ppg) over a time ranging from a lower limit of about 10 hours, 24 hours, 36 hours, or 48 hours to an upper limit of about 120 hours, 96 hours, 72 hours, or 48 hours, and wherein the sag control timeframe of the wellbore fluid may range from any lower limit to any upper limit and encompasses any subset therebetween.

In some embodiments, the properties of the mineral particles described herein may be tailored to achieve sag control. Properties of the mineral particles that can be tailored to achieve sag control may include, but are not limited to, size (e.g., median diameter of about 2 microns or less or at least one mode of a multimodal distribution having such a peak diameter of about 2 microns or less), shape (e.g., particle shapes with lower sphericity like discus, platelet, flake, ligamental, acicular, spiked with a substantially spherical or ovular shape, spiked with a discus or platelet shape, fibrous, toroidal, and the like), coatings, linking (described further herein), and the like, and any combination thereof.

While the plurality of mineral particles described herein (e.g., those listed in Section I) may be useful in achieving sag control of a wellbore fluid, in some preferred embodiments, sag control may utilize the mineral particles described herein that comprise at least one of rhodochrosite, tenorite, awaruite, albandite, bismuth oxychloride, fluorite, manganese carbonate, manganese (II) oxide, manganese (II,III) oxide, manganese (III) oxide, manganese (IV) oxide, manganese (VII) oxide, spalerite, strontianite, tenorite, zinc carbonate, zinc oxide, and any combination thereof.

In some embodiments, when using two or more mineral particles with different specific gravities to produce a homogeneous wellbore fluid, the size and shape of each of the mineral particles may be tailored so as to minimize separation of the mineral particles, which may lead to a wellbore fluid with a striated density profile. For example, a first mineral particle with a discus or platelet shape may impede the settling of a second mineral particle that has a high settling or migration rate (e.g., a higher specific gravity, spherical particle).

II.d. Viscosity

At least some of the mineral particles described herein may, in some embodiments, be capable of being linked by linking agents. Linking of mineral particles may allow for increasing the viscosity of the wellbore fluid or forming a solid mass described further herein. One skilled in the art with the benefit of this disclosure should recognize that, inter alia, the composition of the mineral particles described herein may determine if the mineral particles are suitable for being linked and to what degree they can be linked.

Examples of linking agents suitable for use in conjunction with the wellbore additives and/or the wellbore fluids may, in some embodiments, include, but are not limited to, eugenol, guaiacol, methyl guaiacol, salicyladehyde, salicyladimine, salicylic acid, sodium salicylate, acetyl salicylic acid, methyl salicylic acid, methyl acetylsalicylic acid, anthranilic acid, acetyl anthranilic acid, vanillin, derivatized 1,2-dihydroxybenzene (catechol), derivatized or unsubstituted phthalic acid, ortho-phenylenediamine, ortho-aminophenol, ortho-hydroxyphenylacetic acid, alkylsilanes, esters, ethers, and the like, and any combination thereof. Additionally polymers of the foregoing examples, or suitable derivatives thereof, may used as linking agents. For example, vinyl derivatives of the foregoing examples may be used in synthesizing a polymer or copolymer suitable for use as a linking agents. In another example, carboxylated derivates of the foregoing examples may be used in derivatizing a polyamine to yield suitable linking agents. Additional examples may include, but are not limited to, compounds (including polymers and lower molecular weight molecules) having at least two silane moieties, ester moieties, ether moieties, sulfide moieties, amine moieties, and the like, and any combination thereof.

Viscosity increases from linking with linking agents may, in some embodiments, yield wellbore fluids that remain pumpable, wellbore fluids that are non-pumpable, or hardened masses. One skilled in the art with the benefit of this disclosure should understand that the extent of the viscosity increase may depend on, inter alia, the composition of the mineral particles described herein, the composition of the linking agents, the relative concentration of the mineral particles and the linking agents, intended use, additional components in the wellbore fluid, and any combination thereof.

In some embodiments, the increase in viscosity may yield a hardened mass. As used herein, the term "hardened mass" is used to indicate a composition that has transitioned from a liquid-state to a substantially solid-state, but does not imply a size or function of the hardened mass. For example, a hardened mass may be a plug that spans cross-sectional area of the wellbore or a composition that has filled a crack in an existing hardened mass (e.g., a cement sheath) and solidified. In some embodiments, a hardened mass may be rigid or relatively pliable. In some embodiments, such a hardened mass may be permeable (e.g., 1 Da to about 100 mDa) or substantially non-permeable (e.g., about 100 mDa or less).

In some embodiments, the wellbore additives and/or the wellbore fluids may comprise linking agents at an amount ranging from a lower limit of about 0.1%, 0.5%, or 1% by weight of the mineral particles to an upper limit of about 10%, 5%, or 1% by weight of the mineral particles.

While a plurality of mineral particles described herein may be useful for linking, in some preferred embodiments, linking methods and compositions may utilize the mineral particles described herein that comprise at least one of $Al_2O_3$, $Al_2SiO_5$, $BaCO_3$, $BaO$, $BeO$, $(BiO)_2CO_3$, $BiO_3$, $Bi_2O_3$, $CaO$, $CaCO_3$, $(Ca,Mg)CO_3$, $CdS$, $CdTe$, $Ce_2O_3$, $(Fe,Mg)Cr_2O_4$, $Cr_2O_3$, $CuO$, $Cu_2O$, $Cu_2(AsO_4)(OH)$, $CuSiO_3 \cdot H_2O$, $Fe_3Al_2(SiO_4)_3$, $Fe^{2+}Al_2O_4$, $Fe_2SiO_4$, $FeCO_3$, $Fe_2O_3$, $\alpha$-$Fe_2O_3$, $\alpha$-$FeO(OH)$, $Fe_3O_4$, $FeTiO_3$, $(Fe,Mg)SiO_4$, $(Mn,Fe,Mg)(Al,Fe)_2O_4$, $CaFe^{2+}_2Fe^{3+}Si_2O_7O(OH)$, $(YFe^{3+}Fe^{2+}U,Th,Ca)_2(Nb,Ta)_2O_8$, $MgO$, $MnCO_3$, $Mn_2SiO_4$, $Mn(II)_3Al_2(SiO_4)_3$, $(Na_{0.3}Ca_{0.1}K_{0.1})(Mn^{4+},Mn^{3+})_2O_4 \cdot 1.5H_2O$, $(Mn,Fe)_2O_3$, $(Mn^{2+},Fe^{2+},Mg)(Fe^{3+},Mn^{3+})_2O_4$, $(Mn^{2+},Mn^{3+})_6[O_8|SiO_4]$, $Ca(Mn^{3+},Fe^{3+})_{14}SiO_{24}$, $Ba(Mn^{2+})(Mn^{4+})_8O_{16}(OH)_4$, $CaMoO_4$, $MoO_2$, $MoO_3$, $NbO_4$, $(Na,Ca)_2Nb_2O_6(OH,F)$, $(Y,Ca,Ce,U,Th)(Nb,Ta,Ti)_2O_6$, $(Y,Ca,Ce,U,Th)(Ti,Nb,Ta)_2O_6$, $(Fe,Mn)(Ta,Nb)_2O_6$, $(Ce,La,Ca)B$-$SiO_5$, $(Ce,La)CO_3F$, $(Y,Ce)CO_3F$, $MnO$, $MnO_2$, $Mn_2O_3$, $Mn_3O_4$, $Mn_2O_7$, $MnO(OH)$, $(Mn^{2+},Mn^{3+})_2O_4$, $NiO$, $NiAs_2$, $NiAs$, $NiAsS$, $Ni_xFe$ (x=2-3), $(Ni,Co)_3S_4$, $PbSiO_3$, $PbCO_3$, $(PbCl)_2CO_3$, $Pb^{2+}_2Pb^{4+}O_4$, $PbCu[(OH)_2|SO_4]$, $(Sb^{3+},Sb^{5+})O_4$, $Sb_2SnO_5$, $Sc_2O_3$, $SnO$, $SnO_2$, $Cu_2FeSnS_4$, $SrO$, $SrSO_4$, $SrCO_3$, $(Na,Ca)_2Ta_2O_6(O,OH,F)$, $ThO_2$, $(Th,U)SiO_4$, $TiO_2$, $UO_2$, $V_2O_3$, $VO_2$, $V_2O_5$, $Pb_5(VO_4)_3Cl$, $VaO$, $Y_2O_3$, $ZnCO_3$, $ZnO$, $ZnFe_2O_4$, $ZnAl_2O_4$, $ZrSiO_4$, $ZrO_2$, $ZrSiO_4$, allemontite, altaite, aluminum oxide, anglesite, tin oxide, antimony trioxide, barium carbonate, barium oxide, bastnaesite, beryllium oxide, birnessite, bismite, bismuth oxycarbonates, bismuth oxychloride, bismuth trioxide, bismuth (III) oxide, bixbyite, bournonite, braunite, cadimum sulfide, cadimum telluride, calaverite, calcium oxide, calcium carbonate, cassiterite, cerium oxide, cerussite, chromium oxide, clinoclase, columbite, copper, copper oxide, corundum, crocoite, cuprite, dolomite, euxenite, fergusonite, franklinite, gahnite, geothite, greenockite, hausmmanite, hematite, hercynite, hessite, ilvaite, Jacobsite, magnesium oxide, manganese carbonate, manganite, manganosite, magnetite, manganese dioxide, manganese (IV) oxide, manganese oxide, manganese tetraoxide, manganese (II) oxide, manganese (III) oxide, microlite, minium, molybdenum (IV) oxide, molybdenum oxide, molybdenum trioxide, nickel oxide, pearceite, phosgenite, psilomelane, pyrochlore, pyrolusite, rutile, scandium oxide, siderite, smithsonite, spessartite, stillwellite, stolzite, strontium oxide, tantalite, tenorite, tephroite, thorianite, thorite, tin dioxide, tin (II) oxide, titanium dioxide, uraninite, vanadium oxide, vanadium trioxide, vanadium (IV) oxide, vanadium (V) oxide, witherite, wulfenite, yttrium oxide, zinc carbonate, zincite, zircon, zirconium oxide, zirconium silicate, zinc oxide, and suitable combinations thereof. Mineral particles not suitable for linking may include, but are not limited to, $CaF_2$, $CuS$, $CuFeS_2$, $FeS$, $FeS_2$, $HgS$, $Hg_2Cl_2$, $NiAs$, $NiAsS$, $PbS$, and $(Zn,Fe)S$.

II.e. Compressive Strength

In some embodiments, the mineral particles described herein may advantageously have a higher unconfined compressive strength (e.g., about 1200 psi or greater) that allow for load-bearing applications (e.g., proppant applications). In some embodiments, the mineral particles described herein may advantageously have a moderate to high unconfined compressive strength (e.g., about 500 psi or greater) that allow for implementation in applications like cements, wellbore strengthening additives, and gravel packs. The unconfined compressive strength of a mineral particle may depend on, inter alia, the composition of the mineral particle, the shape of the mineral particle, additional processing steps in producing the mineral particle (e.g., calcining after precipitation), and the like, and any combination thereof.

While a plurality of mineral particles described herein may have at least moderate compressive strength, in some preferred embodiments, such mineral particles may comprise at least one of $CaCO_3$, $(Ca,Mg)CO_3$, $FeCO_3$, $Fe_2O_3$, $\alpha$-$Fe_2O_3$, $\alpha$-$FeO(OH)$, $Fe_3O_4$, $FeTiO_3$, $(Fe,Mg)SiO_4$, $MnO$, $MnO_2$, $Mn_2O_3$, $Mn_3O_4$, $Mn_2O_7$, $MnO(OH)$, $(Mn^{2+},Mn^{3+})_2O_4$, calcium carbonate, hematite, siderite, magnetite, manganese dioxide, manganese (IV) oxide, manganese oxide, manganese tetraoxide, manganese (II) oxide, manganese (III) oxide, $Al_2O_3$, $Al_2SiO_5$, $CaF_2$, $CaWO_4$, $CuO$, $Cu_2O$, $CuS$, $Cu_2S$, $CuS_2$, $Cu_9S_5$, $CuFeS_2$, $Cu_5FeS_4$, $CuS.Co_2S_3$, $CuSiO_3 \cdot H_2O$, $Fe_3Al_2(SiO_4)_3$, $Fe^{2+}Al_2O_4$, $Fe_2SiO_4$, $FeWO_4$, $FeS$, $FeS_2$, $Fe_{(1-x)}S$ (wherein x=0 to 0.2), $(Fe,Ni)_9S_8$, $Fe^{2+}Ni_2^{3+}S_4$, $(Fe,Mn)WO_4$, $(Mn,Fe,Mg)(Al,Fe)_2O_4$, $CaFe^{2+}_2Fe^{3+}Si_2O_7O(OH)$, $MnCO_3$, $Mn_2S$, $Mn_2SiO_4$, $MnWO_4$, $Mn(II)_3Al_2(SiO_4)_3$, $(Na_{0.3}Ca_{0.1}K_{0.1})(Mn^{4+},Mn^{3+})_2O_4 \cdot 1.5H_2O$, $(Mn,Fe)_2O_3$, $(Mn^{2+},Fe^{2+},Mg)(Fe^{3+},Mn^{3+})_2O_4$, $(Mn^{2+},Mn^{3+})_6[O_8|SiO_4]$, $Ca(Mn^{3+},Fe^{3+})_{14}SiO_{24}$, $CaMoO_4$, $MoO_2$, $MoO_3$, $NiO$, $Ni_xFe$ (x=2-3), $(Ni,Co)_3S_4$, $NiS$, $SnO$, $SnO_2$, $Cu_2FeSnS_4$, $TiO_2$, $ZnCO_3$, $ZnO$, $ZnFe_2O_4$, $ZnAl_2O_4$, $ZnCO_3$, $ZnS$, $ZnO$, $(Zn_{(1-x)}Fe_{(x)}S)$, $(Zn,Fe)S$, $ZrSiO_4$, $ZrO_2$, $ZrSiO_4$, albandite, alamandite, aluminum oxide, andalusite, awaruite, birnessite, bixbyite, bornite, braunite, bravoite, calcium oxide, carrollite, cassiterite, chalcopyrite, copper oxide, copper sulfide, corundum, covellite, digenite, ferberite, ferrous sulfide, franklinite, gahnite, geothite, hausmmanite, hercynite, huebnerite, ilmenite, ilvaite, Jacobsite, larsenite, manganese carbonate, manganite, manganosite, marcasite, marmatite, millerite, molybdenum oxide, molybdenum trioxide, nickel oxide, pentlandite, pyrite, pyrolusite, pyrrhotite, rutile, scheelite, siegenite, smithsonite, spalerite, spessartite, sphalerite, tenorite, tephroite, tin dioxide, tin (II) oxide, titanium dioxide, wolframite, wurtzite, zinc carbonate, zincite, zircon, zirconium oxide, zirconium silicate, zinc oxide, and suitable combinations thereof.

II.f. Degradability

At least some of the mineral particles described herein may, in some embodiments, be at least partially degradable. As used herein, the term "degradable" refers to a material being capable of reduced in size by heterogeneous degradation (or bulk erosion) and homogeneous degradation (or surface erosion), and any stage of degradation in between these two. This degradation can be a result of, inter alia, a chemical or thermal reaction, for example, dissolution by an acidic fluid. One skilled in the art with the benefit of this disclosure should recognize that, inter alia, the composition of the mineral particles described herein may determine if the mineral particles are degradable and to what extent they are degradable.

While a plurality of mineral particles described herein may be degradable, in some preferred embodiments, degradable mineral particles may comprise at least one of $BaCO_3$, $(BiO)_2CO_3$, $CaWO_4$, $CaCO_3$, $CuO$, $FeCO_3$, $(Ce,La)CO_3F$, $(Y,Ce)CO_3F$, $PbCO_3$, $(PbCl)_2CO_3$, $SrCO_3$, $ZnCO_3$, aragonite, bastnaesite, barium carbonate, bismuth oxycarbonate, calcium carbonate, cerussite, copper oxide, manganese carbonate, phosgenite, rhodochrosite, scheelite, siderite, smithsonite, strontianite, witherite, zinc carbonate, and suitable combinations thereof. Examples of mineral particles described herein that may not be degradable may, in some embodiments, include, but are not limited to, mineral particles that comprise aluminum oxide, antimony sulfide, antimony tin oxide, antimony trioxide, bismuth (III) oxide, cadmium sulfide, cadmium telluride, copper, copper sulfide, ferrous sulfide, magnesium oxide, magnetite, manganese dioxide, pyrite, strontium oxide, zirconium silicate, zinc oxide, and any combination thereof.

Degradation of the minerals described herein may advantageously be used in a plurality of wellbore operations, e.g., cleanup operations (e.g., in removing a filter cake or plug from a lost circulation operation) and cementing operations (e.g., in enhancing the permeability of a cement plug to allow for fluid to flow therethrough while still providing structural strength). Additionally, degradation may be advantageous in reducing the viscosity of a fluid by degrading mineral particles that contribute to the viscosity (e.g., by shape and/or by linking).

Examples of degradation agents that may be useful in at least partially degrading mineral particles described herein may, in some embodiments, include, but are not limited to, acid sources (e.g., inorganic acids, organic acid, and polymers that degrade into acids like polylactic acid), alkaline sources (e.g., bases), and oxidizers (e.g., peroxide compounds, permanganate compounds, and hexavalent chromium compounds).

In some embodiments, the mineral particles described herein may be chosen so as to degrade over a desired amount of time, which may be dependent on, inter alia, particle size, particle shape, wellbore temperature, and mineral particle composition. For example, calcium carbonate rather than lead carbonate may be utilized, in some embodiments, when for faster degradation. In another example, manganese carbonate may, in some embodiments, be chosen for slower degradation in colder wellbore environments and faster degradation in hotter wellbore environments.

II.g. Recovery and Recycling

In some embodiments, the mineral particles described herein may be recovered from the wellbore fluids and/or wellbore additives and recycled for another use. It should be noted that the term "recovery" relative to mineral particles described herein encompasses collection of the mineral particles from the wellbore fluids and the physical or chemical portions thereof (e.g., collecting mineral particles that have been partially degraded or collecting the chemicals resultant from degradation like salt or ions). As used herein, the term "recycle" refers encompasses both using the mineral particles again without significant physical or chemical modification (e.g., adding to another wellbore fluid after cleaning or applying a coating) and significantly changing the physical or chemical nature of the mineral particles (e.g., melting, grinding to change the diameter distribution, dissolving and precipitating new mineral particles, and the like).

Figure 2:
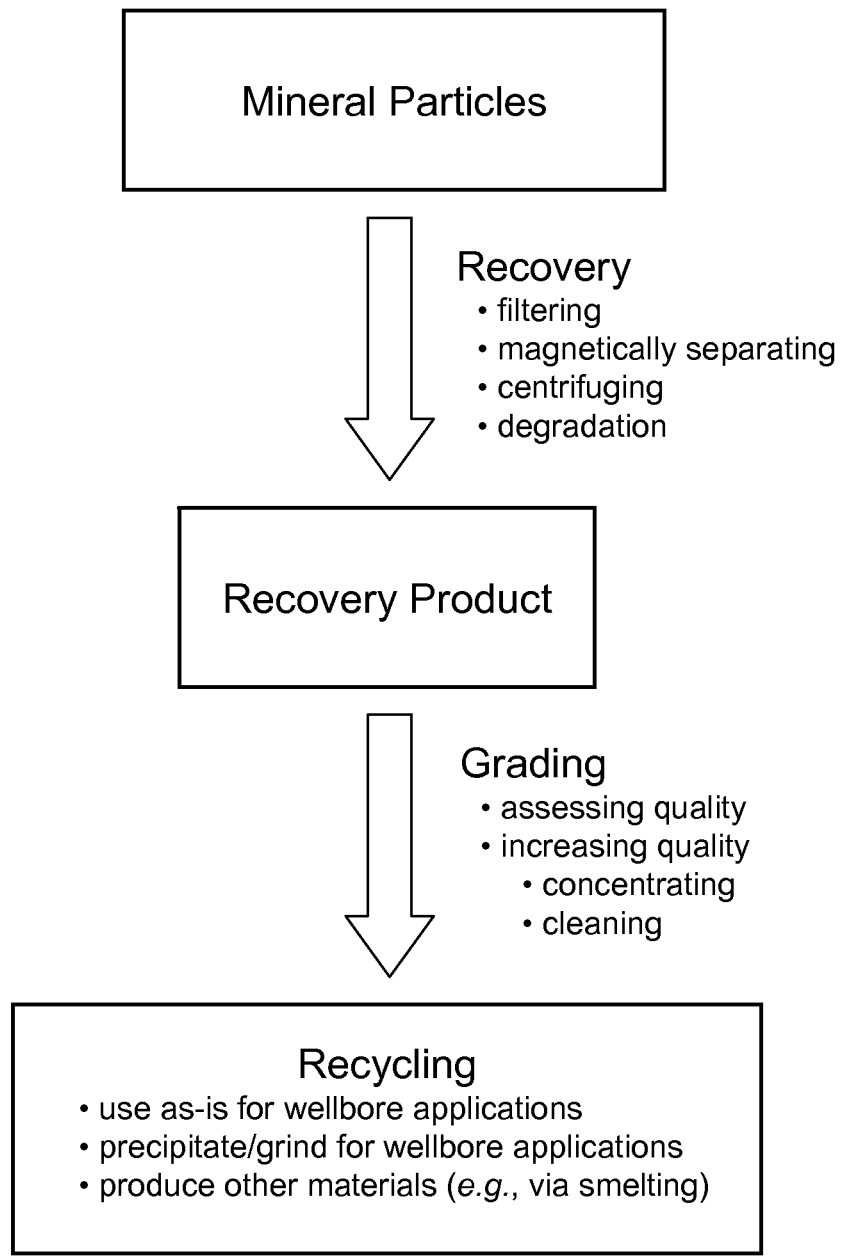
FIG. 2 illustrates exemplary recovery and recycling processes according to at least some embodiments described herein.

Referring now to FIG. 2, some embodiments may involve recovering the mineral particles described herein so as to yield a recovered mineral product (e.g., the mineral particles, the mineral particles partially degraded, and/or the degradation products of the mineral particles), optionally grading the recovered mineral product, and recycling the recovered mineral product. Recovery of mineral particles described herein may, in some embodiments, involve at least one of: filtering, magnetically extracting, centrifuging, sludging, chelating, linking, dissolving, chemically degrading, supercritical fluid extraction, and the like, and any combination thereof.

For example, some of the mineral particles described herein (e.g., magnetite, awaruite, chromite, ilmenite, and siderite) have a magnetic susceptibility that allows for the use of magnetic separation, optionally in combination with other methods, to extract the mineral particles from a wellbore fluid and/or wellbore additive to yield a recovered mineral product. In some embodiments, the recovered mineral product may be used in another wellbore fluid and/or wellbore additive.

In some embodiments, recovery of the mineral particles described herein may involve degrading the mineral particles while they resided the wellbore and collecting the resultant fluid (i.e., the recovered mineral product), which may, in some embodiments, be processed so as to concentrate of the chemicals resultant from the degradation. For example, an acid may be used to degrade rhodochrosite that resides in the wellbore so as to yield a fluid that comprises manganese ions. Such a fluid, depending on the additional components of the fluid, may then be concentrated, neutralized, and then used for precipitation of manganese carbonate mineral particles for use in additional wellbore operations.

The recovered mineral product (e.g., the mineral particles, the mineral particles partially degraded, and/or the degradation products of the mineral particles) may, in some embodiments, be in the solid form (e.g., a plurality of particles or a hardened mass), liquid form (e.g., a sludge, a slurry, or a low viscosity fluid), or the like.

One skilled in the art with the benefit of this disclosure should understand that the recovery methods and resultant recovered mineral product for each mineral particle described herein may, in some embodiments, depend on, inter alia, the composition of the mineral particles, the composition of the wellbore fluid and/or wellbore additive (e.g., the additional components therein), the viscosity of the wellbore fluid, and the like, and any combination thereof.

Recycling of the recovered mineral product described herein may, in some embodiments, involve using the recovered mineral product as-is (e.g., producing a wellbore fluid described herein with the recovered mineral product), processing the recovered mineral product so as to yield mineral particles described herein for use of wellbore applications (e.g., grinding or precipitating to form mineral particles described herein), or using the recovered mineral product and methods and processes that produce other materials (e.g., smelting to form steel, processing to extract precious metals, and the like).

Recycling of a recovered mineral product described herein may, in some embodiments, be on-site or off-site. For example, some embodiments may involve magnetically extracting mineral particles (e.g., awaruite) on-site so as to yield a recovered mineral product and recycling recovered mineral product comprising the mineral particles into another wellbore fluid. In another example, some embodiments may involve degrading mineral particles (e.g., rhodochrosite or tenorite) into a recovered mineral product comprises the corresponding dissolved salts and recycling the recovered mineral product to yield precipitated mineral particles described herein, which may, in some embodiments, be performed on-site or at a suitable processing facility.

Recycling the mineral particles described herein may, in some embodiments, involve grading of the recovered mineral product. As used herein, the term "grading" refers to assessing the quality of the recovered mineral product relative to the desired recycling method. Grading may, in some embodiments, be achieved by gravimetry, atomic spectroscopy, mass spectroscopy, Auger electron spectroscopy, X-ray photoelectron spectroscopy, and the like.

In some embodiments, the recycling of the mineral particles described herein may involve methods that concentrates of the mineral particles (or components thereof) in the recovered mineral product, cleans the mineral particles (or components thereof) (e.g., washing or burning away organic matter), and the like, each of which may be used to enhance the grading value of the recovered mineral product. For example, in recycling methods that involve processing the recovered mineral product to achieve other materials (e.g., smelting rhodochrosite in the processes for making cast iron or steel), the recovered mineral product may be burned to remove organic material, which may increase the grading value and, consequently, the intrinsic value of the recovered mineral product.

II.h. Other Properties and/or Capabilities

Some of the mineral particles described herein may have other characteristics that may impart properties and/or capabilities to a wellbore fluid and/or wellbore additive described herein. These characteristics may advantageously be utilized to further reduce or eliminate additional components in wellbore fluids and/or wellbore additives without reducing or eliminating the properties and/or capabilities thereof.

For example, the antimicrobial properties of tenorite, copper oxide, and the like may advantageously allow for the weighting agent to also serve as, inter alia, an antimicrobial additive. Antimicrobial agents may be useful in maintaining a clean wellbore and mitigating microbial growth during transportation of a wellbore additive.

II.i. Combining Properties and/or Capabilities

As described further herein, it may be advantageous to utilize mineral particles that allow for adjusting the density of a wellbore fluid and providing at least one of the other properties and/or capabilities described herein.

For example, in some embodiments, the wellbore additives and/or the wellbore fluids may comprise mineral particles described herein having a median diameter of about 2 microns or less, a Mohs hardness of about 5 or less, and a specific gravity of about 2.6 or greater, including combination of any subset of the foregoing ranges (e.g., mineral particles having a median diameter between about 250 nm and about 1 micron, a Mohs hardness of about 2 to about 4, and a specific gravity of about 5 to about 20) so as to provide for a wellbore fluid with a desired density, sag control, and abrasion mitigation.

In some embodiments, wellbore additives and/or wellbore fluids may be produced on-site, on-the-fly, or off-site. For example, if a well site is near a mine or facility that produced mineral particles described herein, the wellbore additives and/or wellbore fluids may be produced on-site. In another example, the wellbore fluid tailorability that the mineral particles described herein may further provide for on-the-fly modification of wellbore fluids so as to respond to the conditions of the wellbore and/or events that occur in the wellbore.

The mineral particles described herein may be present in the wellbore fluid in an amount sufficient for a particular application. In certain embodiments, the mineral particles described herein may be present in a wellbore fluid in an amount up to about 70% by volume of the wellbore fluid (v %) (e.g., about 5%, about 15%, about 20%, about 25%, about 30%, about 35%, about 40%, about 45%, about 50%, about 55%, about 60%, about 65%, etc.). In certain embodiments, the mineral particles described herein may be present in the wellbore fluid in an amount of 10 v % to about 40 v %.

In some embodiments, the wellbore additives may comprise the mineral particles described herein and optionally further comprise other particles and/or additional components suitable for use in a specific wellbore operation (e.g., proppants and cement particles as described further herein). Wellbore additives may, in some embodiments, be dry powder or gravel, a liquid with a high concentration of the mineral particles described herein (e.g., a slurry), and the like.

As described herein, in some embodiments, it may be advantageous to include a combination of types of mineral particles described herein so as to achieve a wellbore fluid with desired properties and/or capabilities. Distinctions between types of mineral particles may, in some embodiments, be defined by at least one of mineral composition, production method, average diameter, diameter distribution, presence or absence of coating, coating composition, and the like, and any combination thereof. As such, achieving homogeneous mixtures of dry wellbore additives may be aided by inclusion of a dry lubricant to facilitate homogeneous mixing and flowability. Examples of dry lubricant may, in some embodiments, include, but are not limited to, molybdenum disulfide, graphite, boron nitride, tungsten disulfide, polytetrafluoroethylene particles, bismuth sulfide, bismuth oxychloride, and the like, and any combination thereof. In some embodiments, a dry lubricant may advantageously have a specific gravity greater than about 2.6 (e.g., molybdenum disulfide, tungsten disulfide, bismuth sulfide, and bismuth oxychloride) so as contribute to the density of the resultant wellbore fluid.

Examples of base fluids suitable for use in conjunction with the wellbore fluids may, in some embodiments, include, but are not limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous-based fluid; and any combination thereof.

Suitable water-in-oil emulsions, also known as invert emulsions, may have an oil-to-water ratio from a lower limit of greater than about 30:70, 40:60, 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. No. 5,905,061 entitled "Invert Emulsion Fluids Suitable for Drilling" filed on May 23, 1997, U.S. Pat. No. 5,977,031 entitled "Ester Based Invert Emulsion Drilling Fluids and Muds Having Negative Alkalinity" filed on Aug. 8, 1998, U.S. Pat. No. 6,828,279 entitled "Biodegradable Surfactant for Invert Emulsion Drilling Fluid" filed on Aug. 10, 2001, U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004, U.S. Pat. No. 7,645,723 entitled "Method of Drilling Using Invert Emulsion Drilling Fluids" filed on Aug. 15, 2007, and U.S. Pat. No. 7,696,131 entitled "Diesel Oil-Based Invert Emulsion Drilling Fluids and Methods of Drilling Boreholes" filed on Jul. 5, 2007, each of which are incorporated herein by reference in their entirety. It should be noted that for water-in-oil and oil-in-water emulsions, any mixture of the above may be used including the water being and/or comprising an aqueous-miscible fluid.

In some embodiments, the wellbore fluids described herein may be foamed. As used herein, the term "foam" refers to a two-phase composition having a continuous liquid phase and a discontinuous gas phase. In some embodiments, the wellbore fluids may comprise a base fluid, the mineral particles described herein, a gas, and a foaming agent.

Examples of gases may include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater particle transport capability, up to about 12 lb of particles per gal of wellbore fluid.

In some embodiments, the quality of a wellbore fluid that is foamed may range from a lower limit of about 5%, 10%, 25%, 40%, 50%, 60%, or 70% gas volume to an upper limit of about 95%, 90%, 80%, 75%, 60%, or 50% gas volume, and wherein the quality may range from any lower limit to any upper limit and encompasses any subset therebetween. Most preferably, the wellbore fluid that is foamed may have a foam quality from about 85% to about 95%, or about 90% to about 95%.

Examples of foaming agents may include, but are not limited to, cationic foaming agents, anionic foaming agents, amphoteric foaming agents, nonionic foaming agents, or any combination thereof. Nonlimiting examples of suitable foaming agents may, in some embodiments, include, but are not limited to, surfactants like betaines, sulfated or sulfonated alkoxylates, alkyl quarternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

In some embodiments, the wellbore additives and/or the wellbore fluids described herein may optionally further comprise additional components, e.g., filler particles, salts, inert solids, fluid loss control agents, emulsifiers, dispersion aids, corrosion inhibitors, emulsion thinners, emulsion thickeners, viscosifying agents, gelling agents, crosslinking agents, surfactants, cement particulates, proppants, gravel particulates, lost circulation materials, pH control additives, breakers, defoaming agents, biocides, stabilizers, scale inhibitors, gas hydrate inhibitors, oxidizers, reducers, friction reducers, clay stabilizing agents, set accelerators, set retarders, and combinations thereof. One skilled in the art with the benefit of this disclosure should understand the appropriate composition, concentration, and combination of individual additional components that may be included in the wellbore additives and/or the wellbore fluids that comprise the mineral particles described herein.

The wellbore additives and/or the wellbore fluids described herein may be used in a plurality of wellbore operations. Examples wellbore operations may, in some embodiments, include, but are not limited to, drilling operations, managed-pressure drilling operations, dual-gradient drilling, tripping operations, logging operations, lost circulation operations, stimulation operations, sand control operations, completion operations, acidizing operations, scale inhibiting operations, water-blocking operations, clay stabilizer operations, fracturing operations, gravel packing operations, wellbore strengthening operations, and sag control operations. The wellbore additives and/or the wellbore fluids described herein may, in some embodiments, be used in full-scale operations or pills. As used herein, a "pill" is a type of relatively small volume of specially prepared wellbore fluid placed or circulated in the wellbore.

III. Wellbore Operations Using Wellbore Fluids Comprising Mineral Particles Described Herein As discussed throughout, the mineral particles described herein may be useful in a variety of wellbore fluids and/or wellbore additives. The wellbore fluid tailorability that the mineral particles described herein may, in some embodiments, be particularly advantageous in some wellbore operations, e.g., fracturing operations, cementing operations, and the like. Further, as mentioned above, the wellbore fluid tailorability may provide for on-the-fly modification of wellbore fluids so as to respond to the conditions of the wellbore and/or events that occur in the wellbore. Such conditions may be determined prior to introduction of the wellbore fluid into the wellbore (e.g., using logging information and lithological theory) and/or actually encountered during use of the wellbore fluid (e.g., while circulating the wellbore fluid). An on-the-fly modification to at least one of the wellbore fluid properties or capabilities (e.g., through alteration to the identity or concentration of the mineral particles in the wellbore fluid) can be made to optimize a wellbore operation (e.g., encountering an unknown lost circulation or thief zone).

Examples of wellbore operations (full-scale and/or pill operations) that can employ the mineral particles and wellbore fluids described herein may, in some embodiments, include, but are not limited to, drilling operations, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, and sag control operations.

Some embodiments of the present invention may further include producing hydrocarbons from at least a portion of a subterranean formation, wherein the subterranean formation has been treated with a wellbore fluid described herein. In some embodiments, hydrocarbons may be produced from the portion of the subterranean formation having been treated with a wellbore fluid described herein (e.g., a fracturing fluid) or from a second portion of the subterranean formation having not been treated with the wellbore fluid (e.g., as described herein relative to a fluid flow control operation).

It should be noted that as used herein terms like "linkable mineral particle," "degradable mineral particle," and the like are used in examples to indicated at least one property of the mineral particle and do not necessarily preclude mineral particles with other properties, e.g., a "linkable mineral particle" may also be degradable and recyclable or a "sag control mineral particle" may also be linkable and degradable.

III.a. Cementing Operations

In some embodiments, the wellbore additives and/or the wellbore fluids described herein may be used in cementing operations. As used herein, the term "cementing operations" refers to operations where a composition is placed in a wellbore and/or a subterranean formation and sets therein to form a hardened mass, which encompasses hydraulic cements, construction cements, linked mineral particles described herein, and some polymeric compositions that set (e.g., polymers like epoxies and latexes).

Examples of cementing operations that may utilize the mineral particles described herein may, in some embodiments, include, but are not limited to, primary cementing operations (e.g., forming cement sheaths in a wellbore annulus or forming wellbore plugs for zonal isolation or fluid diversion) and remedial cementing operations (e.g., squeeze operations, repairing and/or sealing microannuli and/or cracks in a hardened mass, or forming plugs). In cementing operations, a plurality of fluids are often utilized including, but not limited to, cementing fluids (sometimes referred to as settable compositions), spacer fluids, and displacement fluids. For example, a cementing operation may utilize, in order, (1) a first spacer fluid, (2) a cementing fluid, optionally (3) a second spacer fluid, and (4) a displacement fluid, each of which may independently be a wellbore fluid comprising mineral particles described herein.

In some embodiments, cementing operations may utilize a plurality of fluids in order such that each subsequent fluid has a higher density than the previous fluid. Achieving the desired density for a wellbore fluid in a cementing operation may, in some embodiments, involve the use of mineral particles described herein. Further, as described herein, the mineral particles utilized in such wellbore fluids may be chosen to achieve other properties and/or capabilities in the wellbore fluids. It should be noted that in a cementing operation when a plurality of wellbore fluids are used, each wellbore fluid may be independently designed with mineral particles described herein and do not necessarily require the use of the same mineral particle in each of the wellbore fluids or the use of a mineral particle described herein in all of the wellbore fluids. For example, the first spacer fluid may include fluorite, the cementing fluid may include manganese oxide, and the second spacer may include tenorite.

One of ordinary skill in the art should understand the plurality of uses of the mineral particles described herein and the appropriate incorporation into the wellbore fluids suitable for use in conjunction with cementing operations. For example, cementing fluids, spacer fluids, and/or displacement fluids, may comprise mineral particles described herein so as to achieve a desired density, a desired level of sag control, and/or a desired viscosity. In another example, linkable mineral particles may be included in the cementing fluids and utilized so as to yield hardened masses that comprise linked mineral particles. In yet another example, degradable mineral particles may be included in the cementing fluids and utilized so as to yield hardened masses that that can be at least partially degraded. Further, depending on the composition of the mineral particle, combinations of the foregoing examples may be appropriate, e.g., mineral particles comprising rhodochrosite may be useful in cementing fluids to achieve a desired density and a desired level of sag control, to link in forming the hardened mass, and to degrade for increasing the permeability of the hardened mass.

In some embodiments, cementing operations may involve forming hardened masses that comprise at least one of: linked mineral particles described herein, cement particles, and any combination thereof. As described above, the term "hardened mass," as used herein, refers to a composition that has transitioned from a liquid-state to a substantially solid-state and does not imply a size or function of the hardened mass. For example, a hardened mass may be a plug that spans cross-sectional area of the wellbore or a composition that has filled a crack in an existing hardened mass (e.g., a cement sheath) and solidified.

In some embodiments, wellbore fluids (e.g., settable compositions) suitable for use in conjunction with cementing operations may comprise a base fluid and linkable mineral particles and optionally further comprise cement particles.

In some embodiments in which linkable mineral particles described herein are used, the linking agents may be introduced into the wellbore in a preceding wellbore fluid, the same wellbore fluid, and/or a subsequent wellbore fluid as the settable composition. For example, a first wellbore fluid that comprises linkable mineral particles described herein may be introduced into a wellbore and subsequently a second wellbore fluid that comprises the appropriate linking agents may be introduced into the wellbore so as to contact at least some of the linkable mineral particles in the first wellbore fluid. The linking agent should then link the mineral particles therein, thus forming a hardened mass comprising linked mineral particles. In other examples, some embodiments may involve introducing a wellbore fluid that comprises a base fluid, suitable linkable mineral particles described herein, and suitable linking agents into a wellbore penetrating a subterranean formation and allowing the linking agents to link the linkable mineral particles so as to yield a hardened mass that comprises linked mineral particles.

The amount of linkable mineral particles described herein included in wellbore fluids (e.g., settable compositions) so as to achieve hardened masses may depend on, inter alia, the composition and amount of the optional cement particles, the composition and amount of the optional additional components (e.g., fillers described further herein), the composition of the mineral particles, the average diameter of the mineral particles, the diameter distribution of the mineral particles, the dimensions and volume of the set cement, and the like, and any combination thereof.

In some embodiments, the degradable mineral particles described herein (linkable or otherwise) may be included in wellbore fluids (e.g., settable compositions) suitable for use in conjunction with cementing operations described herein so as to allow for changing the permeability of the hardened mass produced therefrom. In some embodiments, degradation and/or dissolution of the mineral particles in a hardened mass may be achieved by exposing the hardened mass to an acidic treatment fluid, a treatment fluid comprising an acid source, a basic treatment fluid, an oxidizing treatment fluid, and the like.

Change of the permeability of a hardened mass may be useful, in some embodiments, for converting a substantially impermeable hardened mass (e.g., having a permeability less than about $10^{-2}$ milliDarcy) that substantially blocks fluid flow to a permeable hardened mass that allow fluid to flow therethrough, for example, when alleviating zonal isolation from plugs and/or wellbore/subterranean formation separation from sheaths. The ability to convert a hardened mass from substantially impermeable to permeable may, in some embodiments, advantageously eliminate the need to drill out plugs or perforate sheaths in order to restore a desired level of permeability.

In some embodiments, wellbore fluids (e.g., settable compositions) suitable for use in conjunction with cementing operations may comprise a base fluid, mineral particles described herein capable of linking, and mineral particles capable of degradation. In some embodiments, wellbore fluids (e.g., settable compositions) suitable for use in conjunction with cementing operations may comprise a base fluid, cement particles, and degradable mineral particles and optionally further comprise linkable mineral particles. In some embodiments, the degradable mineral particles may also be linkable.

In some embodiments, the hardened mass after degradation and/or dissolution of the degradable mineral particles therein may have a permeability ranging from a lower limit of about $10^{-1}$ milliDarcy ("mDa"), 1 mDa, or 10 mDa to an upper limit of about 1000 mDa, 100 mDa, or 10 mDa, and wherein the permeability may range from any lower limit to any upper limit and encompasses any subset therebetween.

The amount of degradable mineral particles described herein included in wellbore fluids (e.g., settable compositions) suitable for use in conjunction with cementing operations so as to achieve hardened masses capable of changing permeability may depend on, inter alia, the composition and amount of the cement particles, the composition and amount of the optional additional components (e.g., fillers described further herein), the composition of the degradable mineral particles, the average diameter of the degradable mineral particles, the diameter distribution of the degradable mineral particles, the dimensions of the set cement, and the like, and any combination thereof.

In some embodiments, the cementing operations described herein may involve the recovery and recycling the mineral particles described herein. For example, after degradation of a portion of a hardened mass, the resultant fluid may be recovered and recycled according to any suitable recovery and recycling method described herein suitable for use in conjunction with the mineral particles utilized. In another example, a spacer fluid or displacement fluid utilizing mineral particles described herein may be recovered and recycled according to any suitable recovery and recycling method described herein suitable for use in conjunction with the mineral particles utilized.

Base fluids suitable for use in conjunction with wellbore fluids suitable for use in conjunction with cementing operations (e.g., spacer fluids, settable compositions, and/or displacement fluids) may, in some embodiments, include any of the base fluids described herein in relation to wellbore fluids in general. In some embodiments where wellbore fluids comprise cement particles, the base fluid may preferably comprise water. In some embodiments, wellbore fluids suitable for use in conjunction with cementing operations may be foamed as described herein in relation to wellbore fluids in general.

The base fluid may be present in the wellbore fluids suitable for use in conjunction with cementing operations in an amount sufficient to form a pumpable slurry. In some embodiments, the wellbore fluids suitable for use in conjunction with cementing operations may include base fluids in an amount ranging from a lower limit of about 30% by weight of cement ("bwoc"), 50% bwoc, or 100% bwoc to an upper limit of about 200% bwoc, 150% bwoc, or 100% bwoc, and wherein the amount may range from any lower limit to any upper limit and encompasses any subset therebetween. As used herein, the term "by weight of cement" refers to by weight of the cement and/or linkable mineral particles.

Examples of cement particles suitable for use in conjunction with the wellbore fluids and/or wellbore additives described herein may, in some embodiments, include, but are not limited to, hydraulic cements, Portland cement, gypsum cements, calcium phosphate cements, high alumina content cements, silica cements, high alkalinity cements, shale cements, acid/base cements, magnesia cements (e.g., Sorel cements), fly ash cements, zeolite cement systems, cement kiln dust, slag cements, micro-fine cements, epoxies, bentonites, latexes, and the like, any derivative thereof, and any combination thereof.

In some embodiments, the wellbore fluids and/or wellbore additives described herein suitable for use in conjunction with cementing operations may optionally further comprise additional components described herein in relation to wellbore fluids in general. Examples of preferred additional components may, in some embodiments, include, but are not limited to, filler particles, salts, weighting agents, inert solids, fluid loss control agents, emulsifiers, dispersion aids, corrosion inhibitors, emulsion thinners, emulsion thickeners, viscosifying agents, gelling agents, crosslinking agents, surfactants, cement particulates, proppants, gravel particulates, lost circulation materials, pH control additives, breakers, defoaming agents, biocides, stabilizers, scale inhibitors, gas hydrate inhibitors, oxidizers, reducers, friction reducers, clay stabilizing agents, set accelerators, set retarders, and combinations thereof.

In some embodiments, the hardened masses, the wellbore fluids (e.g., settable compositions), and/or wellbore additives described herein suitable for use in conjunction with cementing operations may optionally further comprise filler particles. Filler particles may, in some embodiments, be useful in tailoring the mechanical properties of the final set cement, e.g., some polymers and rubbers may allow for hardened masses that are more pliable than hardened masses without such polymers and rubbers. Examples of filler particles suitable for use in conjunction with the wellbore fluids and/or wellbore additives described herein may, in some embodiments, include, but are not limited to, fly ash, fume silica, hydrated lime, pozzolanic materials, sand, barite, calcium carbonate, ground marble, iron oxide, manganese oxide, glass bead, crushed glass, crushed drill cutting, ground vehicle tire, crushed rock, ground asphalt, crushed concrete, crushed cement, ilmenite, hematite, silica flour, fume silica, fly ash, elastomers, polymers, diatomaceous earth, a highly swellable clay mineral, nitrogen, air, fibers, natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene propylene rubber, ethylene propylene diene terpolymer rubber, ethylene vinyl acetate copolymer, fluorosilicone rubber, silicone rubber, poly-2,2,1-bicycloheptene (polynorbornene), alkylstyrene, crosslinked substituted vinyl acrylate copolymer, nitrile rubber (butadiene acrylonitrile copolymer), hydrogenated nitrile rubber, fluoro rubber, perfluoro rubber, tetrafluoroethylene/propylene, starch polyacrylate acid graft copolymer, polyvinyl alcohol cyclic acid anhydride graft copolymer, isobutylene maleic anhydride, acrylic acid type polymer, vinylacetate-acrylate copolymer, polyethylene oxide polymer, carboxymethyl cellulose polymer, starch-polyacrylonitrile graft copolymer, polymethacrylate, polyacrylamide, and non-soluble acrylic polymer, and the like, and any combination thereof.

In some embodiments, the wellbore fluids and/or wellbore additives described herein suitable for use in conjunction with cementing operations may include filler particles in an amount ranging from a lower limit of about 5% bwoc, 10% bwoc, 25% bwoc, or 50% bwoc to an upper limit of about 150% bwoc, 100% bwoc, or 50% bwoc, and wherein the amount may range from any lower limit to any upper limit and encompasses any subset therebetween.

III.b. Fracturing

In some embodiments, the wellbore additives and/or the wellbore fluids described herein may be used in fracturing operations. Fracturing operations, in some embodiments, may involve introducing a first wellbore fluid (e.g., pad fluid) into a subterranean formation at a pressures sufficient to create or extend at least one fracture in the subterranean formation and introducing a second wellbore fluid (e.g., a proppant slurry) into the subterranean formation so as to create a proppant pack in the at least one fracture. As used herein, a "proppant pack" refers to a collection of proppant particles in a fracture.

Advantageously, at least some of the proppant mineral particles described herein (e.g., those having an unconfined compressive strength of about 1200 psi or greater) may, in some embodiments, allow for tailoring a proppant slurry to have a desired density with proppant mineral particles also being useful as proppant particles, thereby reducing the need for additional weighting agent and/or traditional proppant particles (and associated costs) to achieve substantially the same result. In some embodiments, the proppant mineral particles described herein may optionally be used in fracturing operations in combination with traditional proppant particles.

Examples of traditional proppant particles that may be suitable for use in conjunction with the mineral particles described herein may, in some embodiments, include, but are not limited to, sand, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates (e.g., particulates that may comprise a binder and a filler material wherein suitable filler materials include silica, fumed carbon, carbon black, graphite, mica, titanium dioxide, metasilicate, calcium silicate, kaolin, talc, zirconia, boron, fly ash, hollow glass microspheres, solid glass, and any combination thereof), and the like, and any combination thereof.

The proppant mineral particles described herein and/or traditional proppant particles used in conjunction with fracturing operations generally may have a median diameter ranging from a lower limit of about 350 microns, 500 microns, or 1 mm to an upper limit of about 15 mm, 10 mm, or 5 mm, and wherein the median diameter may range from any lower limit to any upper limit and encompasses any subset therebetween. It should be understood that fibrous materials, that may or may not be used to bear the pressure of a closed fracture, may be included in certain embodiments of the present invention.

In some embodiments, the proppant mineral particles optionally in combination with the traditional proppant particles may be included in the proppant slurries in an amount in the range of from about 0.5 pounds per gallon ("ppg") to about 30 ppg of total proppant content by volume of the fracturing fluid, and encompass any subset therebetween.

In some embodiments, the proppant mineral particles described herein may further be useful for imparting the properties and/or capabilities described herein in relation to wellbore fluids in general (e.g., density, viscosity, sag control, degradation, and the like) to the wellbore fluids suitable for use in conjunction with fracturing operations.

Some embodiments may involve exploiting the degradability of some of the proppant mineral particles described herein to change the permeability of a proppant pack. For example, some embodiments may involve introducing a first wellbore fluid into at least a portion of a subterranean formation at a pressure sufficient to create or extend at least one fracture in the subterranean formation; introducing a second wellbore fluid that comprises a base fluid, a degradable mineral particles described herein suitable for use as a proppant, and proppant particles (e.g., traditional proppant particles and/or substantially non-degradable proppant mineral particles described herein) into the subterranean formation so as to form a proppant pack in the at least one fracture; and contacting the proppant pack with a third wellbore fluid comprising a degradation agent so as to increase the permeability of the proppant pack.

In some embodiments, the mineral particles described herein may be less suitable for use as proppant particles and may be utilized in conjunction with fracturing operations so as to achieve any combination of the properties and/or capabilities described herein in relation to wellbore fluids in general (e.g., density, viscosity, sag control, degradation, and the like). For example, mineral particles comprising bismuth oxychloride may be useful in achieving a desired density and sag control for wellbore fluids suitable for use in conjunction with fracturing operations.

In some embodiments, a proppant slurry may, in some embodiments, comprise a base fluid, traditional proppant particles, and mineral particles that have a suitable diameter distribution to mitigate sag of the traditional proppant particles (e.g., a median diameter of about 2 microns or less) at a concentration to achieve a desired density of the wellbore fluid. In some embodiments, such mineral particles may, depending on the composition, also be degradable (e.g., manganese carbonate or tenorite), applicable as proppants (e.g., manganese carbonate or awaruite), linkable (e.g., manganese carbonate or tenorite), or any combination thereof, thereby allowing for other characteristics of the proppant slurry to be tailored for the conditions encountered in the wellbore and/or subterranean formation.

In some embodiments, the fracturing operations described herein may involve the recovery and recycling the mineral particles described herein. For example, after degradation of a portion of a proppant pack, the resultant fluid may be recovered and recycled according to any suitable recovery and recycling method described herein suitable for use in conjunction with the mineral particles utilized.

Base fluids suitable for use in conjunction with wellbore fluids described herein suitable for use in conjunction with fracturing operations may, in some embodiments, include any of the base fluids described above in relation to wellbore fluids in general. Further, in some embodiments, wellbore fluids described herein suitable for use in conjunction with fracturing operations may be foamed as described above in relation to wellbore fluids in general.

In some embodiments, the wellbore fluids and/or wellbore additives described herein suitable for use in conjunction with fracturing operations may optionally further comprise additional components described herein in relation to wellbore fluids in general. Examples of preferred additional components may, in some embodiments, include, but are not limited to, filler particles, salts, weighting agents, inert solids, fluid loss control agents, emulsifiers, dispersion aids, corrosion inhibitors, emulsion thinners, emulsion thickeners, viscosifying agents, gelling agents, crosslinking agents, surfactants, cement particulates, proppants, gravel particulates, lost circulation materials, pH control additives, breakers, defoaming agents, biocides, stabilizers, scale inhibitors, gas hydrate inhibitors, oxidizers, reducers, friction reducers, clay stabilizing agents, set accelerators, set retarders, and combinations thereof.

III.c. Fluid Flow Control

In some embodiments, the mineral particles described herein may be useful in fluid flow control between a wellbore and the surrounding subterranean formation. Controlling the flow of fluids between the wellbore and the subterranean formation can be especially important for, inter alia, maintaining the proper wellbore pressure (e.g., to mitigate blowouts), minimize loss of wellbore fluids (often expensive wellbore fluids) into the subterranean formation, ensure proper placement of a wellbore fluids (e.g., fluids comprising proppants), and the like.

In some embodiments, fluid flow control may be achieved by at least one of the following mechanisms: bridging a fracture, reducing or blocking formation permeability, providing fluid loss control, sealing a rock surface, sealing a thief zone, enabling fluid diversion, plugging a void, controlling water production, and any combination thereof within the subterranean formation. In some embodiments, pores, voids, high-permeability porosity, and the like may be found in a subterranean formation, e.g., in conjunction with a gravel pack within the wellbore, a borehole surface within the wellbore, a proppant pack within a subterranean formation, rock faces within a subterranean formation (including in fractures, microfractures, and the like), high permeability channels, and the like, and any combination thereof. For simplicity, as used herein, unless otherwise specified, when referring to occurrences (e.g., fluid loss or fluid diversion) in or into a subterranean formation, each of the aforementioned situations/locations are encompassed.

Fluid loss may be problematic in any number of subterranean operations, including drilling operations, fracturing operations, acidizing operations, gravel-packing operations, wellbore clean-out operations, produced water reduction or elimination, and the like. In fracturing operations, for example, fluid loss into the formation may result in a reduction in fluid efficiency, such that the fracturing fluid cannot propagate fracture formation as desired. Without being limited by theory, the wellbore fluids described herein may, in some embodiments, lower the volume of a filtrate that passes through a filter medium. That is, the wellbore fluids described herein (e.g., the mineral particles, the mineral particles in combination with additional fluid components, and/or linked mineral particles) may block the pore throats and spaces that would otherwise allow a fluid to leak out of a desired zone and into an undesired zone. The wellbore fluids described herein (e.g., the mineral particles, the mineral particles in combination with additional fluid components, and/or linked mineral particles) may, in some embodiments, be used to control fluid loss by filling/bridging the pore spaces, voids, and the like in subterranean formation, e.g., forming a type of filter cake that blocks the pore spaces at or near the borehole surface to prevent fluid loss into the subterranean formation.

Fluid diversion is a similar approach to fluid loss control but strives for a somewhat different approach where a portion of the subterranean formation is sealed off or rendered less permeable. By way of example, in order to divert a fluid from highly permeable portions of the formation into the less permeable portions of the formation, a volume of a wellbore fluid may be pumped into the high permeability portion of the formation to partially or completely seal off that portion from subsequent fluid penetration. When being placed, a wellbore fluid will flow most readily into the portion of the formation having the largest pores, fissures, or vugs and, in some embodiments, deposit the mineral particles therein, until that portion is bridged and sealed, thus diverting the remaining and/or subsequent fluid to the next most permeable portion of the formation.

Some embodiments may involve introducing a first wellbore fluid comprising the mineral particles described herein into a subterranean formation; allowing the first wellbore fluid to penetrate into a portion of the subterranean formation in a sufficient amount so as to provide fluid flow control (e.g., sealing, bridging, plugging, diversion, and the like) within a first portion of the subterranean formation; and introducing a second wellbore fluid (e.g., a pad fluid, a proppant slurry, a cementing fluid, or the like) into the subterranean formation such that the first wellbore fluid at least substantially blocks the second wellbore fluid from entering the first portion of the subterranean formation (e.g., an area of fluid flow control that comprises the mineral particles).

Providing fluid flow control may, in some embodiments, be achieved with high density fluids (e.g., the first wellbore fluid having a higher density than the second wellbore fluid), viscosifying fluids optionally through the mineral particle linking (e.g., the first wellbore fluid having a higher viscosity than the second wellbore fluid), forming hardened masses (e.g., with the first wellbore fluid), and any combination thereof.

In some embodiments, the mineral particles described herein may be utilized in the first and/or the second wellbore fluids so as to achieve conditions that allow for fluid flow control operations. For example, the first wellbore fluid may comprise first mineral particles (e.g., comprising awaruite and/or tenorite) in a sufficient amount to yield the desired density that is higher than the second wellbore fluid. In some embodiments, the second wellbore fluid may be useful in other operations like fracturing operations or cementing operations.

In some embodiments, the mineral particles described herein may be utilized for achieving a desired viscosity so as to allow for fluid flow control operations. In some embodiments, the mineral particles described herein suitable for use in conjunction with fluid flow control operations may be linked before, after, and/or during placement in the portion of the subterranean formation where fluid flow control is desired. For example, some embodiments may involve a wellbore fluid comprising the mineral particles described herein may be introduced into a subterranean formation so as to penetrate a portion of the subterranean formation; and contacting the wellbore fluid with a linking agent so as to increase the viscosity of the wellbore fluid. In some embodiments, contacting the wellbore fluid with a linking agent may yield a hardened mass as described further herein.

In some embodiments, the location providing fluid flow control (e.g., where the first wellbore fluid was placed) may be treated so as to increase fluid flow therethrough. For example, some embodiments may involve treating an area of fluid flow control within a subterranean formation with a wellbore fluid comprising a degradation agent so as to degrade and/or dissolve at least a portion of the mineral particles described herein in the area of fluid flow control.

One of ordinary skill in the art with the benefit of this disclosure should understand the plurality of fluid flow control methods that may utilize the mineral particles described herein. For example, some embodiments may involve introducing a first wellbore fluid comprising the mineral particles described herein capable of linking and linking agents into a wellbore so as to incorporate the first wellbore fluid into a gravel pack within the wellbore; introducing a second wellbore fluid into the wellbore such that the first wellbore fluid at least substantially blocks the second wellbore fluid from passing through the gravel pack; and contacting the first wellbore fluid with a third wellbore fluid comprising a degradation agent so as to at least partially degrade the mineral particles, thereby increasing the permeability of the gravel pack.

In some embodiments, the fluid flow control operations described herein may involve the recovery and recycling the mineral particles described herein. For example, after degradation of an area of fluid loss control, the resultant fluid may be recovered and recycled according to any suitable recovery and recycling method described herein suitable for use in conjunction with the mineral particles utilized.

Base fluids suitable for use in conjunction with wellbore fluids suitable for use in conjunction with fluid flow control operations may, in some embodiments, include any of the base fluids described herein in relation to wellbore fluids in general. In some embodiments, wellbore fluids suitable for use in conjunction with fluid flow control operations may be foamed as described herein in relation to wellbore fluids in general.

In some embodiments, the wellbore fluids and/or wellbore additives described herein suitable for use in conjunction with fluid flow control operations may optionally further comprise additional components described herein in relation to wellbore fluids in general. Examples of preferred additional components may, in some embodiments, include, but are not limited to, filler particles, salts, weighting agents, inert solids, fluid loss control agents, emulsifiers, dispersion aids, corrosion inhibitors, emulsion thinners, emulsion thickeners, viscosifying agents, gelling agents, crosslinking agents, surfactants, cement particulates, proppants, gravel particulates, lost circulation materials, pH control additives, breakers, defoaming agents, biocides, stabilizers, scale inhibitors, gas hydrate inhibitors, oxidizers, reducers, friction reducers, clay stabilizing agents, set accelerators, set retarders, and combinations thereof.

III.d. Drilling

In some embodiments, the mineral particles described herein may be useful in drilling operations. Some embodiments may involve drilling a wellbore penetrating a subterranean formation with a wellbore fluid that comprises mineral particles described herein. In some embodiments, the mineral particles described herein may be useful in at least one of: suspending wellbore cuttings (e.g., by contributing to the fluid viscosity and/or sag control), maintaining wellbore pressure (e.g., by contributing to sag control), incorporating into filter cakes that provide fluid loss control, and the like. Further, mineral particles described herein may be chosen to mitigate abrasion of wellbore tools utilized during drilling.

Some embodiments may involve forming a filter cake that comprises mineral particles described herein (optionally linked) in a wellbore so as to provide fluid loss control. Some embodiments may involve cleaning up the filter cake by contacting the filter cake with a degradation agent so as to dissolve degradable mineral particles incorporated therein.

In some embodiments, the fluid flow control operations described herein may involve the recovery and recycling the mineral particles described herein. For example, after degradation of an area of fluid loss control, the resultant fluid may be recovered and recycled according to any suitable recovery and recycling method described herein suitable for use in conjunction with the mineral particles utilized.

Base fluids suitable for use in conjunction with wellbore fluids suitable for use in conjunction with drilling operations may, in some embodiments, include any of the base fluids described herein in relation to wellbore fluids in general. In some embodiments, wellbore fluids suitable for use in conjunction with drilling operations may be foamed as described herein in relation to wellbore fluids in general.

In some embodiments, the wellbore fluids and/or wellbore additives described herein suitable for use in conjunction with drilling operations may optionally further comprise additional components described herein in relation to wellbore fluids in general. Examples of preferred additional components may, in some embodiments, include, but are not limited to, filler particles, salts, weighting agents, inert solids, fluid loss control agents, emulsifiers, dispersion aids, corrosion inhibitors, emulsion thinners, emulsion thickeners, viscosifying agents, gelling agents, crosslinking agents, surfactants, cement particulates, proppants, gravel particulates, lost circulation materials, pH control additives, breakers, defoaming agents, biocides, stabilizers, scale inhibitors, gas hydrate inhibitors, oxidizers, reducers, friction reducers, clay stabilizing agents, set accelerators, set retarders, and combinations thereof.

III.e. On-The-Fly

As described above, the mineral particles described herein may allow for on-the-fly modifications of wellbore fluid properties and capabilities. In some embodiments, the conditions encountered in the wellbore and/or subterranean formation may necessitate changing the properties and/or characteristics of the wellbore fluid on-the-fly (e.g., density, viscosity, level of sag, and the like). On-the-fly modifications may, in some embodiments, include, but are not limited to, changing the concentration of the mineral particles in the wellbore fluid, changing the type of mineral particles in the wellbore fluid (e.g., size, coating or not, type of coating, and the like), changing the relative ratio of two or more mineral particles in the wellbore fluid, changing the concentration of linking agents, introducing a degradation agent to degrade a weighting agent, and the like, and any combination thereof.

By way of nonlimiting example, a wellbore fluid utilizing two mineral particles with different specific gravities (e.g., rhodochrosite and awaruite) may increase the relative concentration of the higher specific gravity particle to achieve a higher density fluid. Adjusting the density of the wellbore fluid may, in some embodiments, be useful when drilling a wellbore so as to maintain the bottom hole pressure at a level that mitigates damage to the subterranean formation (e.g., minimizes fracturing and leak-off) while maintaining a high enough pressure to minimize subterranean fluids from entering the wellbore.

In another example, the density of the wellbore fluid can be reduced on-the-fly with the addition of a degradation agent to degrade a mineral particle (e.g., tenorite, awaruite, rhodochrosite, or the like). Similar to above such a change may be used to mitigate wellbore damage while drilling.

By way of another nonlimiting example, the viscosity of a wellbore fluid utilizing a linkable mineral particle (e.g., rhodochrosite) may be changed on-the-fly with the addition of linking agents for an increase or the addition of a degradation agent for a decrease. In drilling operations, the viscosity of the wellbore fluid may, at least in part, assist in suspending cuttings and bringing them to the surface. However, if too high a viscosity is reached, then pumping the fluid becomes excessively energy intensive. The on-the-fly modification of the viscosity may assist in enhancing the efficacy while minimizing the energy use and cost associated with drilling.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit to an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
introducing a wellbore fluid having a density of about 7 ppg to about 50 ppg into a wellbore penetrating a subterranean formation, the wellbore fluid comprising a base fluid and precipitated mineral particles, and the wellbore fluid having a first viscosity, wherein the precipitated mineral particles are at least partially degradable;
contacting the precipitated mineral particles with a linking agent so as to link at least some of the precipitated mineral particles to one another by the linking agent, thereby increasing the first viscosity to a second viscosity, wherein the linking agent is a polymer synthesized with a vinyl derivative of one selected from the group consisting of eugenol, guaiacol, methyl guaiacol, salicyladehyde, salicyladimine, salicylic acid, sodium salicylate, acetyl salicylic acid, methyl salicylic acid, methyl acetylsalicylic acid, anthranilic acid, acetyl anthranilic acid, vanillin, derivatized 1,2-dihydroxybenzene, derivatized or unsubstituted phthalic acid, ortho-phenylenediamine, ortho-aminophenol, ortho-hydroxyphenylacetic acid, esters, ethers, and any combination thereof.

2. The method of claim 1, wherein the precipitated mineral particles have a specific gravity of about 2.6 to about 5.5.

3. The method of claim 1, wherein the wellbore fluid further comprises second mineral particles; and wherein the precipitated mineral particles and the second mineral particles have a multiparticle specific gravity of about 3 to about 20.

4. The method of claim 1 further comprising:
contacting the wellbore fluid at the second viscosity with a second wellbore fluid comprising a degradation agent.

5. The method of claim 1, wherein contacting the precipitated mineral particles with the linking agent does not form a hardened mass.

6. The method of claim 1, wherein the precipitated mineral particles comprise at least one selected from the group consisting of $Al_2O_3$, $Al_2SiO_5$, $BaCO_3$, $BaO$, $BeO$, $(BiO)_2CO_3$, $BiO_3$, $Bi_2O_3$, $CaO$, $CaCO_3$, $(Ca,Mg)CO_3$, $CdS$, $CdTe$, $Ce_2O_3$, $(Fe,Mg)Cr_2O_4$, $Cr_2O_3$, $CuO$, $Cu_2O$, $Cu_2(AsO_4)(OH)$, $CuSiO_3 \cdot H_2O$, $Fe_3Al_2(SiO_4)_3$, $Fe^{2+}Al_2O_4$, $Fe_2SiO_4$, $FeCO_3$, $Fe_2O_3$, $\alpha$-$Fe_2O_3$, $\alpha$-$FeO(OH)$, $Fe_3O_4$, $FeTiO_3$, $(Fe,Mg)SiO_4$, $(Mn,Fe,Mg)(Al,Fe)_2O_4$, $CaFe^{2+}_2Fe^{3+}Si_2O_7O(OH)$, $(YFe^{3+}Fe^{2+}U,Th,Ca)_2(Nb,Ta)_2O_8$, $MgO$, $MnCO_3$, $Mn_2SiO_4$, $Mn(II)_3Al_2(SiO_4)_3$, $(Na_{0.3}Ca_{0.1}K_{0.1})$ $(Mn^{4+},Mn^{3+})_2O_4 \cdot 1.5H_2O$, $(Mn,Fe)_2O_3$, $(Mn^{2+},Fe^{2+},Mg)(Fe^{3+},Mn^{3+})_2O_4$, $(Mn^{2+},Mn^{3+})_6[O_8|SiO_4]$, $Ca(Mn^{3+},Fe^{3+})_{14}SiO_{24}$, $Ba(Mn^{2+})(Mn^{4+})_8O_{16}(OH)_4$, $CaMoO_4$, $MoO_2$, $MoO_3$, $NbO_4$, $(Na,Ca)_2Nb_2O_6(OH,F)$, $(Y,Ca,Ce,U,Th)(Nb,Ta,Ti)_2O_6$, $(Y,Ca,Ce,U,Th)(Ti,Nb,Ta)_2O_6$, $(Fe,Mn)(Ta,Nb)_2O_6$, $(Ce,La,Ca)BSiO_5$, $(Ce,La)CO_3F$, $(Y,Ce)CO_3F$, $MnO$, $MnO_2$, $Mn_2O_3$, $Mn_3O_4$, $Mn_2O_7$, $MnO(OH)$, $(Mn^{2+},Mn^{3+})_2O_4$, $NiO$, $NiAs_2$, $NiAs$, $NiAsS$, $Ni_2Fe$ to $Ni_3Fe$, $(Ni,Co)_3S_4$, $PbSiO_3$, $PbCO_3$, $(PbCl)_2CO_3$, $Pb^{2+}{}_2Pb^{4+}O_4$, $PbCu[(OH)_2|SO_4]$, $(Sb^{3+},Sb^{5+})O_4$, $Sb_2SnO_5$, $Sc_2O_3$, $SnO$, $SnO_2$, $Cu_2FeSnS_4$, $SrO$, $SrSO_4$, $SrCO_3$, $(Na,Ca)_2Ta_2O_6(O,OH,F)$, $ThO_2$, $(Th,U)SiO_4$, $TiO_2$, $UO_2$, $V_2O_3$, $VO_2$, $V_2O_5$, $Pb_5(VO_4)_3Cl$, $VaO$, $Y_2O_3$, $ZnCO_3$, $ZnO$, $ZnFe_2O_4$, $ZnAl_2O_4$, $ZrO_2$, $ZrSiO_4$, allemontite, altaite, aluminum oxide, anglesite, tin oxide, antimony trioxide, barium carbonate, barium oxide, bastnaesite, beryllium oxide, birnessite, bismite, bismuth oxycarbonates, bismuth oxychloride, bismuth trioxide, bismuth (III) oxide, bixbyite, bournonite, braunite, cadimum sulfide, cadimum telluride, calaverite, calcium oxide, calcium carbonate, cassiterite, cerium oxide, cerussite, chromium oxide, clinoclase, columbite, copper, copper oxide, corundum, crocoite, cuprite, dolomite, euxenite, fergusonite, franklinite, gahnite, geothite, greenockite, hausmmanite, hematite, hercynite, hessite, ilvaite, Jacobsite, magnesium oxide, manganese carbonate, manganite, manganosite, magnetite, manganese dioxide, manganese (IV) oxide, manganese oxide, manganese tetraoxide, manganese (II) oxide, manganese (III) oxide, microlite, minium, molybdenum (IV) oxide, molybdenum oxide, molybdenum trioxide, nickel oxide, pearceite, phosgenite, psilomelane, pyrochlore, pyrolusite, rutile, scandium oxide, siderite, smithsonite, spessartite, stillwellite, stolzite, strontium oxide, tantalite, tenorite, tephroite, thorianite, thorite, tin dioxide, tin (II) oxide, titanium dioxide, uraninite, vanadium oxide, vanadium trioxide, vanadium (IV) oxide, vanadium (V) oxide, witherite, wulfenite, yttrium oxide, zinc carbonate, zincite, zircon, zirconium oxide, zirconium silicate, zinc oxide, and any combination thereof.

7. A method comprising:
introducing a wellbore fluid having a density of about 7 ppg to about 50 ppg into a wellbore penetrating a subterranean formation, the wellbore fluid comprising a base fluid and precipitated mineral particles, and the wellbore fluid having a first viscosity, wherein the precipitated mineral particles are at least partially degradable; and
linking the precipitated mineral particles with a linking agent so as to link at least some of the precipitated mineral particles to one another by the linking agent to yield a second viscosity that is greater than the first viscosity but is not a hardened mass in the wellbore fluid, the wellbore fluid at the second viscosity thereby achieving at least one selected from the group consisting of bridging a fracture, reducing or blocking formation permeability, providing fluid loss control, sealing a rock surface, enabling fluid diversion, plugging a void, controlling water production, and any combination thereof within a first portion of the subterranean formation, wherein the linking agent is a polymer synthesized with a vinyl derivative of one selected from the group consisting of eugenol, guaiacol, methyl guaiacol, salicyladehyde, salicyladimine, salicylic acid, sodium salicylate, acetyl salicylic acid, methyl salicylic acid, methyl acetylsalicylic acid, anthranilic acid, acetyl anthranilic acid, vanillin, derivatized 1,2-dihydroxybenzene, derivatized or unsubstituted phthalic acid, ortho-phenylenediamine, ortho-aminophenol, ortho-hydroxyphenylacetic acid, esters, ethers, and any combination thereof.

8. The method of claim 7 further comprising:
introducing a second wellbore fluid into a second portion of the subterranean formation such that the second wellbore fluid is diverted from the first portion of the subterranean formation.

9. The method of claim 7 further comprising:
contacting the wellbore fluid at the second viscosity with a third wellbore fluid comprising a degradation agent.

10. The method of claim 7, wherein the precipitated mineral particles have a specific gravity of about 2.6 to about 5.5.

11. The method of claim 7, wherein the wellbore fluid further comprises second mineral particles; and wherein the precipitated mineral particles and the second mineral particles have a multiparticle specific gravity of about 3 to about 20.

12. The method of claim 7, wherein the precipitated mineral particles comprise at least one selected from the group consisting of $Al_2O_3$, $Al_2SiO_5$, $BaCO_3$, $BaO$, $BeO$, $(BiO)_2CO_3$, $BiO_3$, $Bi_2O_3$, $CaO$, $CaCO_3$, $(Ca,Mg)CO_3$, $CdS$, $CdTe$, $Ce_2O_3$, $(Fe,Mg)Cr_2O_4$, $Cr_2O_3$, $CuO$, $Cu_2O$, $Cu_2(AsO_4)(OH)$, $CuSiO_3 \cdot H_2O$, $Fe_3Al_2(SiO_4)_3$, $Fe^{2+}Al_2O_4$, $Fe_2SiO_4$, $FeCO_3$, $Fe_2O_3$, $\alpha\text{-}Fe_2O_3$, $\alpha\text{-}FeO(OH)$, $Fe_3O_4$, $FeTiO_3$, $(Fe,Mg)SiO_4$, $(Mn,Fe,Mg)(Al,Fe)_2O_4$, $CaFe^{2+}{}_2Fe^{3+}Si_2O_7O(OH)$, $(YFe^{3+}Fe^{2+}U,Th,Ca)_2(Nb,Ta)_2O_8$, $MgO$, $MnCO_3$, $Mn_2SiO_4$, $Mn(II)_3Al_2(SiO_4)_3$, $(Na_{0.3}Ca_{0.1}K_{0.1})(Mn^{4+},Mn^{3+})_2O_4 \cdot 1.5H_2O$, $(Mn,Fe)_2O_3$, $(Mn^{2+},Fe^{2+},Mg)(Fe^{3+},Mn^{3+})_2O_4$, $(Mn^{2+},Mn^{3+})_6[O_8|SiO_4]$, $Ca(Mn^{3+},Fe^{3+})_{14}SiO_{24}$, $Ba(Mn^{2+})(Mn^{4+})_8O_{16}(OH)_4$, $CaMoO_4$, $MoO_2$, $MoO_3$, $NbO_4$, $(Na,Ca)_2Nb_2O_6(OH,F)$, $(Y,Ca,Ce,U,Th)(Nb,Ta,Ti)_2O_6$, $(Y,Ca,Ce,U,Th)(Ti,Nb,Ta)_2O_6$, $(Fe,Mn)(Ta,Nb)_2O_6$, $(Ce,La,Ca)BSiO_5$, $(Ce,La)CO_3F$, $(Y,Ce)CO_3F$, $MnO$, $MnO_2$, $Mn_2O_3$, $Mn_3O_4$, $Mn_2O_7$, $MnO(OH)$, $(Mn^{2+},Mn^{3+})_2O_4$, $NiO$, $NiAs_2$, $NiAs$, $NiAsS$, $Ni_2Fe$ to $Ni_3Fe$, $(Ni,Co)_3S_4$, $PbSiO_3$, $PbCO_3$, $(PbCl)_2CO_3$, $Pb^{2+}{}_2Pb^{4+}O_4$, $PbCu[(OH)_2|SO_4]$, $(Sb^{3+},Sb^{5+})O_4$, $Sb_2SnO_5$, $Sc_2O_3$, $SnO$, $SnO_2$, $Cu_2FeSnS_4$, $SrO$, $SrSO_4$, $SrCO_3$, $(Na,Ca)_2Ta_2O_6(O,OH,F)$, $ThO_2$, $(Th,U)SiO_4$, $TiO_2$, $UO_2$, $V_2O_3$, $VO_2$, $V_2O_5$, $Pb_5(VO_4)_3Cl$, $VaO$, $Y_2O_3$, $ZnCO_3$, $ZnO$, $ZnFe_2O_4$, $ZnAl_2O_4$, $ZrO_2$, $ZrSiO_4$, allemontite, altaite, aluminum oxide, anglesite, tin oxide, antimony trioxide, barium carbonate, barium oxide, bastnaesite, beryllium oxide, birnessite, bismite, bismuth oxycarbonates, bismuth oxychloride, bismuth trioxide, bismuth (III) oxide, bixbyite, bournonite, braunite, cadimum sulfide, cadimum telluride, calaverite, calcium oxide, calcium carbonate, cassiterite, cerium oxide, cerussite, chromium oxide, clinoclase, columbite, copper, copper oxide, corundum, crocoite, cuprite, dolomite, euxenite, fergusonite, franklinite, gahnite, geothite, greenockite, hausmmanite, hematite, hercynite, hessite, ilvaite, Jacobsite, magnesium oxide, manganese carbonate, manganite, manganosite, magnetite, manganese dioxide, manganese (IV) oxide, manganese oxide, manganese tetraoxide, manganese (II) oxide, manganese (III) oxide, microlite, minium, molybdenum (IV) oxide, molybdenum oxide, molybdenum trioxide, nickel oxide, pearceite, phosgenite, psilomelane, pyrochlore, pyrolusite, rutile, scandium oxide, siderite, smithsonite, spessartite, stillwellite, stolzite, strontium oxide, tantalite, tenorite, tephroite, thorianite, thorite, tin dioxide, tin (II) oxide, titanium dioxide, uraninite, vanadium oxide, vanadium trioxide, vanadium (IV) oxide, vanadium (V) oxide, witherite, wulfenite, yttrium oxide, zinc carbonate, zincite, zircon, zirconium oxide, zirconium silicate, zinc oxide, and any combination thereof.

13. A method comprising:
introducing a wellbore fluid having a density of about 7 ppg to about 50 ppg into a wellbore penetrating a subterranean formation, the wellbore fluid comprising a base fluid and precipitated mineral particles, wherein the precipitated mineral particles are at least partially degradable; and
contacting the precipitated mineral particles with a linking agent so as to link at least some of the precipitated mineral particles to one another by the linking agent into a hardened mass, thereby forming a plug in the wellbore, wherein the linking agent is a polymer synthesized with a vinyl derivative of one selected from the group consisting of eugenol, guaiacol, methyl guaiacol, salicyladehyde, salicyladimine, salicylic acid, sodium salicylate, acetyl salicylic acid, methyl salicylic acid, methyl acetylsalicylic acid, anthranilic acid, acetyl anthranilic acid, vanillin, derivatized 1,2-dihydroxybenzene, derivatized or unsubstituted phthalic acid, ortho-phenylenediamine, ortho-aminophenol, ortho-hydroxyphenylacetic acid, esters, ethers, and any combination thereof.

14. The method of claim 13, wherein the precipitated mineral particles have an unconfined compressive strength of about 500 psi or greater.

15. The method of claim 13 further comprising:
contacting the hardened mass with a second wellbore fluid comprising a degradation agent.

16. The method of claim 13, wherein the precipitated mineral particles comprise at least one selected from the group consisting of $Al_2O_3$, $Al_2SiO_5$, $BaCO_3$, $BaO$, $BeO$, $(BiO)_2CO_3$, $BiO_3$, $Bi_2O_3$, $CaO$, $CaCO_3$, $(Ca,Mg)CO_3$, $CdS$, $CdTe$, $Ce_2O_3$, $(Fe,Mg)Cr_2O_4$, $Cr_2O_3$, $CuO$, $Cu_2O$, $Cu_2(AsO_4)(OH)$, $CuSiO_3 \cdot H_2O$, $Fe_3Al_2(SiO_4)_3$, $Fe^{2+}Al_2O_4$, $Fe_2SiO_4$, $FeCO_3$, $Fe_2O_3$, $\alpha$-$Fe_2O_3$, $\alpha$-$FeO(OH)$, $Fe_3O_4$, $FeTiO_3$, $(Fe,Mg)SiO_4$, $(Mn,Fe,Mg)(Al,Fe)_2O_4$, $CaFe^{2+}_2Fe^{3+}Si_2O_7O(OH)$, $(YFe^{3+}Fe^{2+}U,Th,Ca)_2(Nb,Ta)_2O_8$, $MgO$, $MnCO_3$, $Mn_2SiO_4$, $Mn(II)_3Al_2(SiO_4)_3$, $(Na_{0.3}Ca_{0.1}K_{0.1})(Mn^{4+},Mn^{3+})_2O_4 \cdot 1.5H_2O$, $(Mn,Fe)_2O_3$, $(Mn^{2+},Fe^{2+},Mg)(Fe^{3+},Mn^{3+})_2O_4$, $(Mn^{2+},Mn^{3+})_6[O_8|SiO_4]$, $Ca(Mn^{3+},Fe^{3+})_{14}SiO_{24}$, $Ba(Mn^{2+})(Mn^{4+})_8O_{16}(OH)_4$, $CaMoO_4$, $MoO_2$, $MoO_3$, $NbO_4$, $(Na,Ca)_2Nb_2O_6(OH,F)$, $(Y,Ca,Ce,U,Th)(Nb,Ta,Ti)_2O_6$, $(Y,Ca,Ce,U,Th)(Ti,Nb,Ta)_2O_6$, $(Fe,Mn)(Ta,Nb)_2O_6$, $(Ce,La,Ca)BSiO_5$, $(Ce,La)CO_3F$, $(Y,Ce)CO_3F$, $MnO$, $MnO_2$, $Mn_2O_3$, $Mn_3O_4$, $Mn_2O_7$, $MnO(OH)$, $(Mn^{2+},Mn^{3+})_2O_4$, $NiO$, $NiAs_2$, $NiAs$, $NiAsS$, $Ni_2Fe$ to $Ni_3Fe$, $(Ni,Co)_3S_4$, $PbSiO_3$, $PbCO_3$, $(PbCl)_2CO_3$, $Pb^{2+}_2Pb^{4+}O_4$, $PbCu[(OH)_2|SO_4]$, $(Sb^{3+},Sb^{5+})O_4$, $Sb_2SnO_5$, $Sc_2O_3$, $SnO$, $SnO_2$, $Cu_2FeSnS_4$, $SrO$, $SrSO_4$, $SrCO_3$, $(Na,Ca)_2Ta_2O_6(O,OH,F)$, $ThO_2$, $(Th,U)SiO_4$, $TiO_2$, $UO_2$, $V_2O_3$, $VO_2$, $V_2O_5$, $Pb_5(VO_4)_3Cl$, $VaO$, $Y_2O_3$, $ZnCO_3$, $ZnO$, $ZnFe_2O_4$, $ZnAl_2O_4$, $ZrO_2$, $ZrSiO_4$, allemontite, altaite, aluminum oxide, anglesite, tin oxide, antimony trioxide, barium carbonate, barium oxide, bastnaesite, beryllium oxide, birnessite, bismite, bismuth oxycarbonates, bismuth oxychloride, bismuth trioxide, bismuth (III) oxide, bixbyite, bournonite, braunite, cadimum sulfide, cadimum telluride, calaverite, calcium oxide, calcium carbonate, cassiterite, cerium oxide, cerussite, chromium oxide, clinoclase, columbite, copper, copper oxide, corundum, crocoite, cuprite, dolomite, euxenite, fergusonite, franklinite, gahnite, geothite, greenockite, hausmmanite, hematite, hercynite, hessite, ilvaite, Jacobsite, magnesium oxide, manganese carbonate, manganite, manganosite, magnetite, manganese dioxide, manganese (IV) oxide, manganese oxide, manganese tetraoxide, manganese (II) oxide, manganese (III) oxide, microlite, minium, molybdenum (IV) oxide, molybdenum oxide, molybdenum trioxide, nickel oxide, pearceite, phosgenite, psilomelane, pyrochlore, pyrolusite, rutile, scandium oxide, siderite, smithsonite, spessartite, stillwellite, stolzite, strontium oxide, tantalite, tenorite, tephroite, thorianite, thorite, tin dioxide, tin (II) oxide, titanium dioxide, uraninite, vanadium oxide, vanadium trioxide, vanadium (IV) oxide, vanadium (V) oxide, witherite, wulfenite, yttrium oxide, zinc carbonate, zincite, zircon, zirconium oxide, zirconium silicate, zinc oxide, and any combination thereof.

17. The method of claim 13, wherein the hardened mass consists essentially of the precipitated mineral particles and the linking agent.

* * * * *